US012792165B2

(12) United States Patent
Nomi et al.

(10) Patent No.: US 12,792,165 B2
(45) Date of Patent: Nov. 10, 2026

(54) PAD ATTACHMENT, VIRTUAL INPUT DEVICE, AND INPUT SYSTEM

(71) Applicant: Wacom Co., Ltd., Saitama (JP)

(72) Inventors: Tsukasa Nomi, Saitama (JP); Hideki Fujimaki, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 19/188,881

(22) Filed: Apr. 24, 2025

(65) Prior Publication Data

US 2025/0335048 A1 Oct. 30, 2025

(30) Foreign Application Priority Data

Apr. 25, 2024 (JP) ................................ 2024-071563

(51) Int. Cl.

| | |
|---|---|
| ***G06F 3/039*** | (2013.01) |
| ***G06F 1/26*** | (2006.01) |
| ***G06F 3/0354*** | (2013.01) |
| ***G06F 3/044*** | (2006.01) |
| ***G09G 3/20*** | (2006.01) |

(52) U.S. Cl.

CPC .............. *G06F 3/0393* (2019.05); *G06F 1/26* (2013.01); *G06F 3/03545* (2013.01); *G06F 3/0442* (2019.05); *G06F 3/0446* (2019.05); *G06F 3/0447* (2019.05); *G09G 3/2092* (2013.01); *G09G 2320/0626* (2013.01); *G09G 2320/0666* (2013.01)

(58) Field of Classification Search

CPC .... G06F 3/0393; G06F 3/0442; G06F 3/0446; G06F 3/0447; G06F 3/03545; G06F 1/26; G09G 3/2092; G09G 2320/0626; G09G 2320/0666

See application file for complete search history.

(56) References Cited

U.S. PATENT DOCUMENTS

| | | | | |
|---|---|---|---|---|
| 8,988,355 | B2 * | 3/2015 | Solomon ............... | G06F 3/0219 345/173 |
| 10,013,092 | B2 * | 7/2018 | Rosenberg .............. | G06F 3/016 |
| 10,146,407 | B2 * | 12/2018 | Tijssen .................. | G06F 3/0488 |
| 11,644,912 | B2 * | 5/2023 | Hornung ............... | G06F 3/0393 345/174 |
| 2018/0120959 | A1 * | 5/2018 | Mao .................... | G06F 3/04162 |
| 2021/0247856 | A1 * | 8/2021 | Wang .................. | G06F 3/03545 |

FOREIGN PATENT DOCUMENTS

| | | |
|---|---|---|
| JP | 2013041320 A | 2/2013 |

* cited by examiner

*Primary Examiner* — Kenneth B Lee, Jr.

(74) *Attorney, Agent, or Firm* — Seed Intellectual Property Law Group LLP

(57) ABSTRACT

A pad attachment is provided, which is attached to an operation pad that has at least one physical operation element and that is configured to be disposed on a touch device including a capacitive type touch sensor. The pad attachment includes a memory configured to store device information related to a virtual input device including the operation pad. The pad attachment includes one or more communication elements configured to perform a wireless communication with the touch device via the touch sensor or via a planar sensor different from the touch sensor. The pad attachment includes a transmitting circuit configured to transmit a transmission signal including the device information read from the memory, via the one or more communication elements.

16 Claims, 18 Drawing Sheets

62b

| EFFECTIVE RANGE (PAD COORDINATE SYSTEM X'-Y') | OPERATION ELEMENT |
|---|---|
| P001,P002,P003,P004 | Q |
| P005,P006,P007,P008 | W |
| P009,P010,P011,P012 | E |
| P013,P014,P015,P016 | R |
| P017,P018,P019,P020 | T |
| .... | .... |
| P101,P102,P103,P104 | Enter |
| P105,P106,P107,P108 | Shift |
| .... | .... |
| P301,P302,P303,P304 | ↓ |
| P305,P306,P307,P308 | → |

PAD ATTACHMENT, VIRTUAL INPUT DEVICE, AND INPUT SYSTEM

BACKGROUND

Technical Field

The present disclosure relates to a pad attachment, a virtual input device, and an input system.

Description of the Related Art

A technology is known which displays a virtual input device (for example, a virtual keyboard or a screen keyboard) on a touch device, to thereby emulate a hardware input device based on software.

For example, Japanese Patent Laid-Open No. 2013-041320 (hereinafter, referred to as Patent Document 1) discloses an input device including an operating unit, which is provided to detect operations performed by a user on a touch panel device, and a conductor, which is used for input device determination (hereinafter referred to as a "determination conductor") and which indicates a region for detecting the operations.

However, in the input device disclosed in Patent Document 1, the shape or arrangement pattern of the determination conductor needs to be uniquely determined according to the input device in order to correctly reflect operations performed by the user. In addition, the conductor needs to be provided at a position at which no interference with the operating unit occurs. Thus, adding the determination conductor may impose restrictions on the layout design of the operation pad.

BRIEF SUMMARY OF THE INVENTION

The present disclosure has been made in view of the problems described above. According to one aspect, the present disclosure provides a pad attachment, a virtual input device, and an input system that can improve a degree of freedom of design of an operation pad constituting the virtual input device.

A pad attachment according to a first aspect is attached to an operation pad, wherein the operation pad has at least one physical operation element and is configured to be disposed on a touch device including a capacitive type touch sensor. The pad attachment includes a memory configured to store device information related to a virtual input device including the operation pad, and one or more communication elements configured to perform wireless communication with the touch device via the capacitive type touch sensor or via a planar sensor different from the capacitive type touch sensor. The pad attachment includes a transmitting circuit configured to transmit a transmission signal including the device information read from the memory, via the one or more communication elements.

A virtual input device according to a second aspect of the present disclosure includes the pad attachment described above and an operation pad, which has at least one physical operation element and to which the pad attachment is attached.

An input system according to a third aspect of the present disclosure includes a virtual input device, which includes the pad attachment described above and an operation pad which has at least one physical operation element and to which the pad attachment is attached, and a touch device including a capacitive type touch sensor.

According to the present disclosure, it is possible to improve the degree of freedom in designing the operation pad constituting a virtual input device.

DETAILED DESCRIPTION

Figure 1:
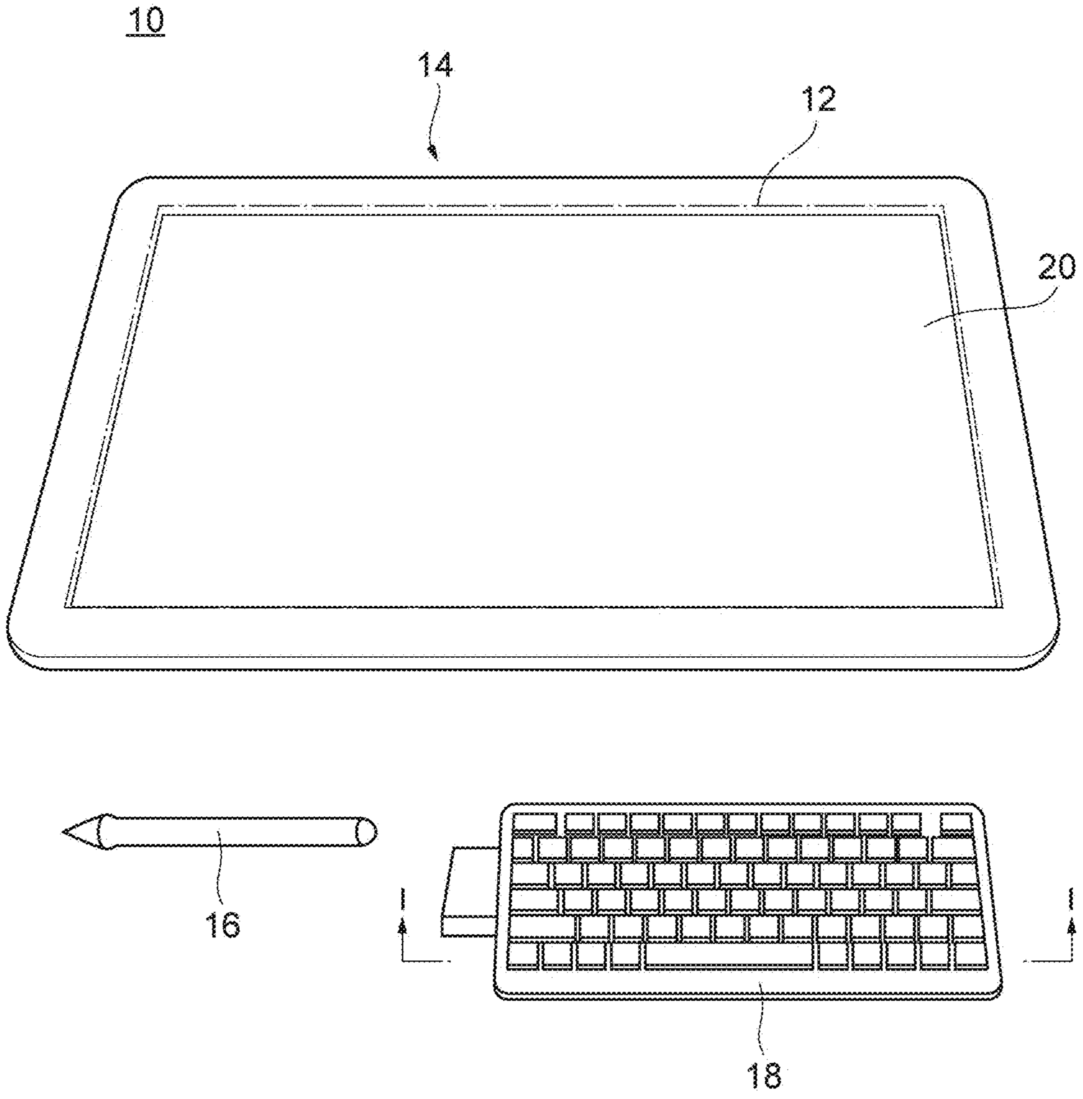
FIG. 1 is a general configuration diagram of an input system according to a first embodiment of the present disclosure.

A pad attachment, a virtual input device, and an input system in the present disclosure will be described with reference to the accompanying drawings. In order to facilitate understanding of the description, identical constituent elements in the drawings are identified by the same reference numerals where possible, and repeated description thereof will be omitted. In addition, the word "section" may be replaced with another word such as "unit," "module," "device," or "element," for example.

It is to be noted that the present disclosure is not limited to embodiments and modifications below and can be modified freely without departing from the scope of the present disclosure. Configurations may freely be combined with each other within a scope in which no technical contradiction occurs. Further, with respect to the steps constituting a flowchart, execution or non-execution of each step or the order of execution of the steps may be changed within a scope in which no technical contradiction occurs.

First Embodiment

An input system 10 in a first embodiment will first be described with reference to FIGS. 1 to 12.

General Configuration of Input System 10

FIG. 1 is a general configuration diagram of the input system 10 in the first embodiment of the present disclosure. The input system 10 is basically constituted by a touch device 14 including a touch panel display 12, an electronic pen 16 which is a pen type pointing device, and a virtual input device 18 that can be freely disposed on the touch device 14.

The touch device 14 is constituted by, for example, a tablet terminal, a smart phone, a laptop, or a personal computer that has/does not have a display function. For example, a user can perform various operations via a graphical user interface (GUI) by touching a touch surface 20 of the touch device 14 with the user's finger.

The electronic pen 16 is configured to be able to communicate unidirectionally or bidirectionally with the touch device 14. In the example of FIG. 1, the electronic pen 16 is an "active capacitance coupling (AES) type" (or capacitive type) stylus that actively generates a signal from electric energy stored in the electronic pen 16 and that transmits the signal to the touch device 14. For example, the user can draw a picture or a text character on the touch device 14 by holding the electronic pen 16 with one hand, and moving the electronic pen 16 while pressing its pen tip against the touch surface 20 of the touch device 14.

The virtual input device 18 is a pseudo physical device that performs an input corresponding to an operation performed by the user on the touch device 14. Specifically, the virtual input device 18 includes an operation pad 22 and a pad attachment 24.

Figure 2:
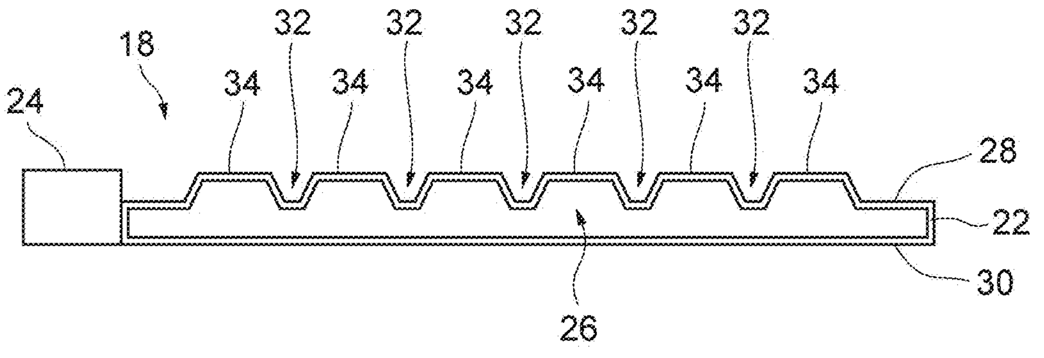
FIG. 2 is a sectional view taken along line I-I of a virtual input device illustrated in FIG. 1.

FIG. 2 is a schematic sectional view taken along a line I-I of the virtual input device 18 illustrated in FIG. 1. The operation pad 22 has a three-dimensional solid or hollow shape. In the example of FIG. 2, an inner part 26 of the operation pad 22 is filled with various types of fluid including air, for example, gas or liquid having a low dielectric constant as compared with the operation pad 22. The operation pad 22 is formed of a material (for example, a resin material) that has a transparent or semitransparent color and that has nonconductivity and elasticity. The operation pad 22 is elastically deformed when an external force is applied to the operation pad 22, and the operation pad 22 can be restored to an original shape when the external force is removed.

The operation pad 22 has a top surface 28 having projections and depressions formed thereon and a flat back surface 30. The top surface 28 of the operation pad 22 is provided with stepped portions 32 for dividing the top surface 28 into a plurality of small regions. In the example of FIG. 2, the stepped portions 32 are recessed shapes arranged in a mesh pattern to form the steps of the top surface 28. However, the stepped portions 32 may have protruding shapes to form the steps of the top surface 28. In the following, a protruding portion formed by each of the small regions will be referred to as an operation element 34.

The operation pad 22 is configured such that, in a state of being disposed on the touch device 14 including a capacitive type touch sensor 82 (in FIG. 4 and FIG. 5), the operation pad 22 produce a capacitance change, in accordance with an approach of the user or a conductor other than the user, at a part of the touch sensor 82 corresponding to a position that the user pushes in from the top surface 28 side.

The pad attachment 24 is provided in such a manner as to be attachable to and detachable from a side portion (the left side portion in a plan view in the example of FIG. 1) of the operation pad 22. As with the electronic pen 16, the pad attachment 24 has an AES system communication function. In the following, a signal transmitted to the pad attachment 24 from the touch device 14 will be referred to as an "uplink signal US," and a signal transmitted to the touch device 14 from the pad attachment 24 will be referred to as a "downlink signal DS."

Configuration of Pad Attachment 24

Figure 3:
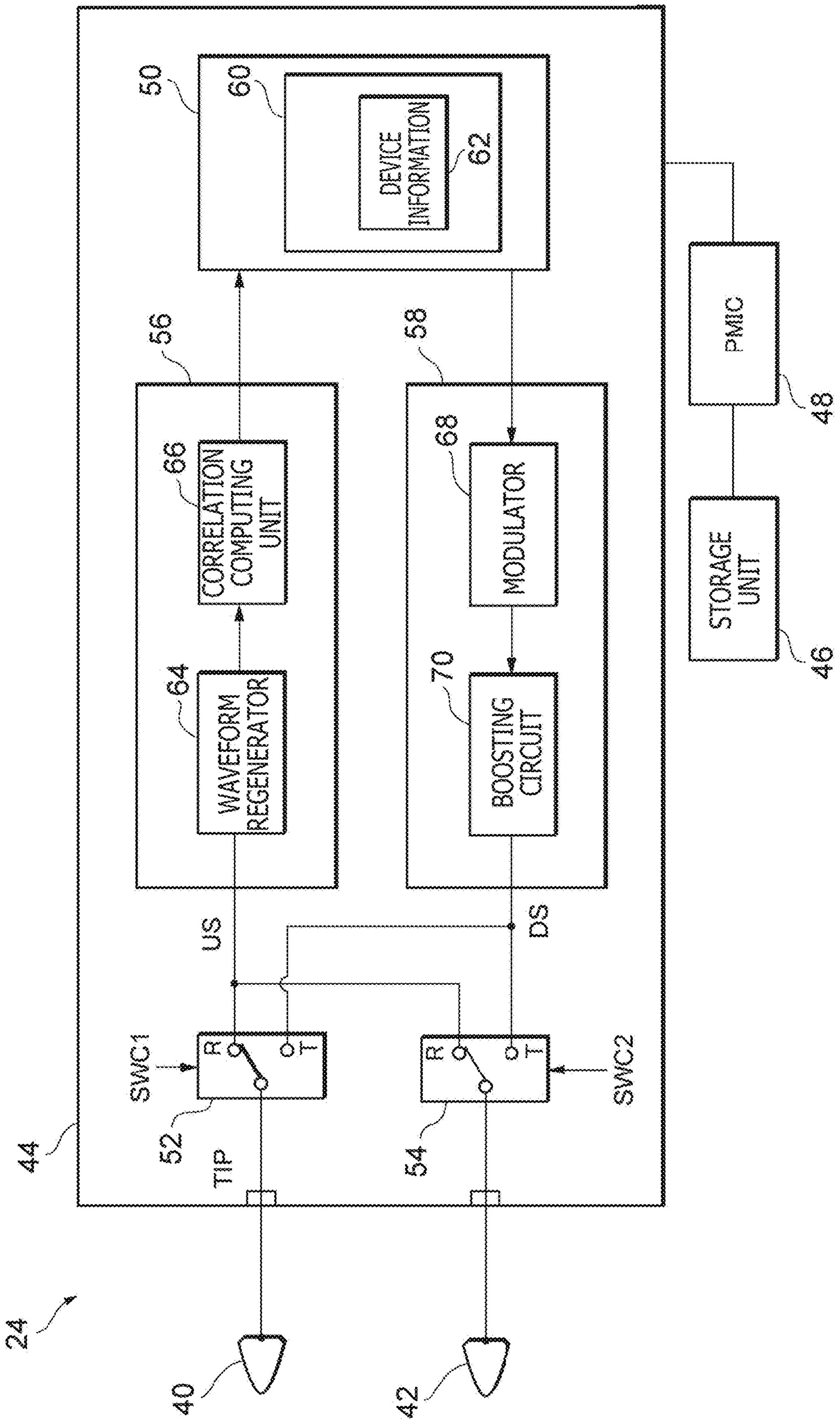
FIG. 3 is a block diagram illustrating an example of a configuration of a pad attachment of FIG. 2.

FIG. 3 is a block diagram illustrating an example of a configuration of the pad attachment 24 in FIG. 2. The pad attachment 24 includes a first electrode 40 (corresponding to a "communication element"), a second electrode 42 (corresponding to a "communication element"), a main board 44, a storage unit 46, and a power management integrated circuit (hereinafter, a PMIC 48).

The first electrode 40 and the second electrode 42 are provided to perform wireless communication with the touch device 14. The first electrode 40 and the second electrode 42 are arranged in such a manner as to be separated from each other at different positions as viewed in a plan view of the pad attachment 24.

The main board 44 is provided with a micro-control unit (hereinafter, referred to as an "MCU 50"), a first switch 52, a second switch 54, a receiving circuit 56, and a transmitting circuit 58.

The MCU 50 is a unit that performs centralized control of various parts of the pad attachment 24. The MCU 50 is configured to be able to receive the uplink signal US from the touch device 14 by performing desired reception control of the receiving circuit 56. The MCU 50 is configured to be able to transmit the downlink signal DS to the touch device 14 by performing desired digital signal processing of data supplied from the receiving circuit 56 and performing desired transmission control of the transmitting circuit 58.

The MCU 50 includes a memory 60 as a non-transitory and computer readable storage medium. In the example of FIG. 3, the memory 60 stores information related to the virtual input device 18 illustrated in FIG. 1 and FIG. 2 (hereinafter, referred to as "device information 62"). Specific contents of the device information 62 will be described later with reference to FIG. 4.

The first switch 52 is a switch element configured such that its common terminal is connected to one of an R-terminal and a T-terminal. The common terminal of the first switch 52 is connected to the first electrode 40. The R-terminal of the first switch 52 is connected to an input terminal of the receiving circuit 56. The T-terminal of the first switch 52 is connected to an output terminal of the transmitting circuit 58. The MCU 50 performs switching control of the first switch 52 by supplying a first switch control signal SWC1 to the first switch 52. The reception of the uplink signal US and the transmission of the downlink signal DS are thereby selectively performed.

The second switch 54 is a switch element configured such that its common terminal is connected to one of an R-terminal and a T-terminal. The common terminal of the second switch 54 is connected to the second electrode 42. The R-terminal of the second switch 54 is connected to the input terminal of the receiving circuit 56. The T-terminal of the second switch 54 is connected to the output terminal of the transmitting circuit 58. The MCU 50 performs switching control of the second switch 54 by supplying a second switch control signal SWC2 to the second switch 54. The reception of the uplink signal US and the transmission of the downlink signal DS are thereby selectively performed.

The receiving circuit 56 is a circuit that demodulates the uplink signal US induced in the first electrode 40 or the second electrode 42 and that outputs data obtained after the demodulation to the MCU 50. A grounding terminal of the receiving circuit 56 is ground-connected to a casing of the pad attachment 24. The receiving circuit 56 specifically includes a waveform regenerator 64 and a correlation computing unit 66.

The waveform regenerator 64 binarizes the level of a voltage induced in the first electrode 40 or the second electrode 42, by using a clock having a predetermined rate, to thereby form a binary sequence of positive and negative polarity values (that is, a chip sequence) and output the chip sequence. The clock frequency is set, for example, as an integral multiple of the chip rate of a spread code.

The correlation computing unit 66 stores the chip sequence from the waveform regenerator 64 in a register, and performs correlation operation with the spread code while sequentially shifting the chip sequence by a clock. The chip sequence included in the uplink signal US is thereby decoded.

The transmitting circuit 58 is a circuit that generates the downlink signal DS under control of the MCU 50. In a case where the downlink signal DS is a "position signal," the transmitting circuit 58 outputs a carrier signal in an unmodulated state. In a case where the downlink signal DS is a "data signal," the transmitting circuit 58 modulates the carrier signal with the data to be transmitted, and outputs the modulation result. The transmitting circuit 58 specifically includes a modulator 68 and a boosting circuit 70.

The modulator 68 generates the carrier signal such as a rectangular wave or a triangular wave, and outputs the carrier signal in a modulated state or as it is under control of the MCU 50. When a burst signal is to be transmitted, the modulator 68 outputs the carrier signal as it is without performing modulation, according to an instruction of the MCU 50. On the other hand, the modulator 68 at a time of transmitting a data signal modulates the carrier signal (using on-off-keying (OOK), phase-shift keying (PSK), or the like) with the data supplied from the MCU 50, and outputs the modulated signal obtained as a result of the modulation.

The boosting circuit 70 generates the downlink signal DS by boosting the output signal supplied from the modulator 68 to a certain amplitude. The downlink signal DS generated by the boosting circuit 70 is sent out to the outside from the first electrode 40 via the first switch 52 or from the second electrode 42 via the second switch 54.

The storage unit 46 is formed by a battery or a capacitor, for example. The storage unit 46 stores or discharges electric energy. The storage unit 46 supplies driving electric power to electronic parts or electronic elements mounted on the main board 44. The PMIC 48 is an IC for monitoring the state of the storage unit 46 and supplying electric power to the main board 44.

Configuration of Touch Device 14

Figure 4:
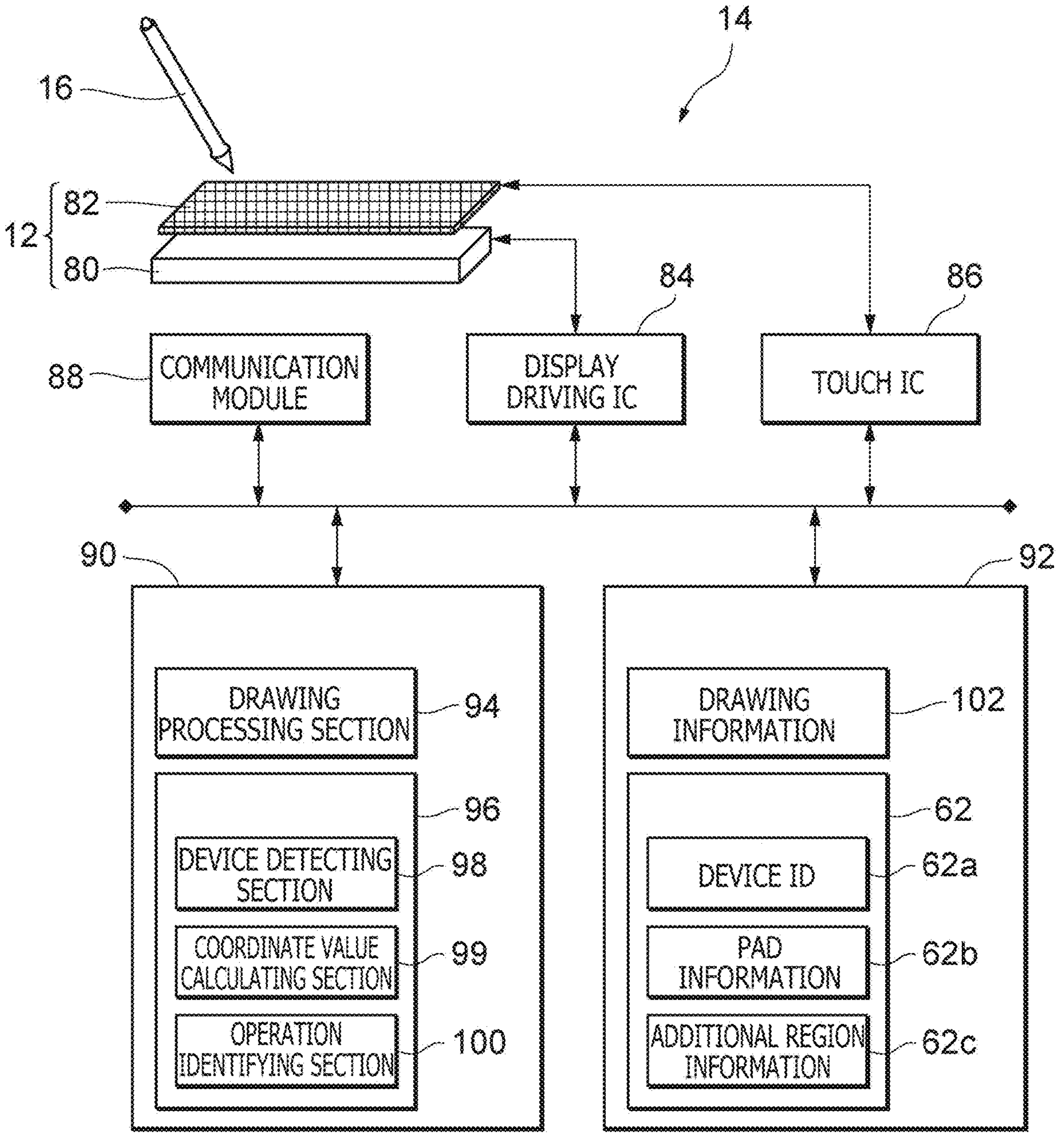
FIG. 4 is a block diagram illustrating an example of a configuration of a touch device of FIG. 1.

FIG. 4 is a block diagram illustrating an example of a configuration of the touch device 14 of FIG. 1. The touch device 14 specifically includes the touch panel display 12, a display driving IC 84, a touch IC 86, a communication module 88, a host processor 90, and a memory 92.

The touch panel display 12 includes a display panel 80 capable of visibly displaying content and the touch sensor 82 disposed to coincide with the display panel 80 in a plan view. The display panel 80 can display a monochrome image or a color image. The display panel 80 is constituted by, for example, a liquid crystal panel, an organic electro-luminescence (EL) panel, an electronic paper, or a quantum dot panel. The liquid crystal panel may be of either a backlight type, a mini light emitting diode (LED) type, or a micro LED type.

In the example of the present figure, the touch sensor 82 is a sensor of an "external attachment type" externally attached to the display panel 80. However, in place of this, the touch sensor 82 may be a sensor of a "built-in type" (an on-cell type or an in-cell type, if further classified) configured integrally with the display panel 80.

The touch sensor 82 is a capacitive type sensor formed by a plurality of sensor electrodes arranged in a planar form. The touch sensor 82 includes, for example, a plurality of X-line electrodes for detecting a position on an X-axis of a sensor coordinate system and a plurality of Y-line electrodes for detecting a position on a Y-axis of the sensor coordinate system. The touch sensor 82 may be a self-capacitance type sensor in which block-shaped electrodes are arranged in a form of a two-dimensional lattice, in place of the mutual capacitance type sensor described above.

The display driving IC 84 is an IC that is electrically connected to the display panel 80 and performs driving control on the display panel 80. The display driving IC 84 drives the display panel 80 on the basis of a display signal supplied from the host processor 90. Various images or videos are thereby displayed in a display region of the display panel 80.

The touch IC 86 is an IC that is electrically connected to the touch sensor 82 and performs driving control of the touch sensor 82. The touch IC 86 drives the touch sensor 82 on the basis of a control signal supplied from the host processor 90. The touch IC 86 thereby performs [1] a "pen detecting function" of detecting the electronic pen 16, [2] a "touch detecting function" of detecting a touch made by a user's finger or the like, and [3] a "device detecting function" of detecting the virtual input device 18.

The pen detecting function includes, for example, a function of scanning the touch sensor 82, a function of receiving and analyzing the downlink signal DS, a function of estimating the state (such as the position, posture or orientation, and pen pressure) of the electronic pen 16, and a function of generating and transmitting the uplink signal US including a command for the electronic pen 16. The touch detecting function includes, for example, a function of two-dimensional scanning of the touch sensor 82, a function of obtaining a heat map on the touch sensor 82, and a function of classifying regions (such as finger regions, palm regions, and the like) on the heat map. The device detecting function includes, for example, a function of scanning the touch sensor 82, a function of receiving and analyzing the downlink signal DS, a function of identifying the operation pad 22, a function of estimating the disposition (such as the position and posture or orientation) of the operation pad 22, and a function of receiving an operation using the operation pad 22.

Thus, a GUI is constructed as a combination of the input functions of the electronic pen 16, the virtual input device 18, and the touch sensor 82 and the output function of the display panel 80.

The communication module 88 has a communicating function of performing a wired communication or a wireless communication with an external device. The touch device 14 can thereby exchange various types of data with the external device.

The host processor 90 is constituted by an arithmetic processing device including a central processing unit (CPU), a graphics processing unit (GPU), or a micro-processing unit (MPU). The host processor 90 functions as a drawing processing section 94 and an operation processing section 96 by reading and executing a program and data stored in the memory 92.

The drawing processing section 94 receives a writing operation using the electronic pen 16, and performs digital ink generation processing and rendering processing. Digital ink data formats, or what are generally called "ink description languages," include, for example, Wacom Ink Layer Language (WILL), Ink Markup Language (InkML), and Ink Serialized Format (ISF).

The operation processing section 96 performs data processing related to operation of the virtual input device 18. Specifically, the operation processing section 96 includes a device detecting section 98, a coordinate value calculating section 99, and an operation identifying section 100.

The device detecting section 98 detects the virtual input device 18 disposed on the touch device 14. An example of a determination condition includes [1] detection of a communication with the pad attachment 24, [2] detection of a contact of the virtual input device 18 with the touch surface 20, and the like. Incidentally, the "contact with the touch surface 20" can be detected on the basis of the presence or absence of a pressure action, the presence or absence of a magnet suction, the presence or absence of a clearance between the virtual input device 18 and the touch surface 20, or the like.

When the device detecting section 98 detects the virtual input device 18, the coordinate value calculating section 99 determines the presence or absence of a touch in a pad coordinate system by using pad information 62*b* corresponding to the operation pad 22, and calculates a coordinate value indicating the position of the touch (hereinafter referred to also as a "touch coordinate value").

The operation identifying section 100 identifies a user operation on the operation pad 22 by using the touch coordinate value calculated by the coordinate value calculating section 99 and the pad information 62*b* corresponding to the operation pad 22. For example, in a case where the operation element 34 is a character key (keyboard), a corresponding "character" or a "function" associated with the corresponding key is identified. In a case where the operation element 34 is a trackball, a corresponding "direction" is identified. In a case where the operation element 34 is an electronic (music) keyboard, a corresponding "sound" and "touch strength" are identified. An analog-like operation and output can be realized by representing the touch strength in three levels or more, for example.

The memory 92 is constituted by a non-transitory and computer readable storage medium. In the example of FIG. 4, the memory 92 stores drawing information 102 and the device information 62.

The drawing information 102 includes a drawing result obtained through an operation using an input device including the electronic pen 16. An example of the drawing result includes stroke data (or digital ink) including coordinate values, a pen pressure value, an inclination angle, and the like obtained at a time of drawing (generating) a stroke and the like.

The device information 62 includes various types of information related to the virtual input device 18. In the example of FIG. 4, the device information 62 includes a device identifier (ID) 62*a*, the pad information 62*b*, and additional region information 62*c*.

The device ID 62*a* includes identification information that can uniquely identify the identity (the device itself) or type of the virtual input device 18. An example of the identification information includes [1] a serial number, a model name, or a model number of the virtual input device 18, [2] a serial number, a model name, or a model number of the operation pad 22, [3] a serial number, a model name, or a model number of the pad attachment 24, and the like.

The pad information 62*b* includes various types of information related to the operation pad 22. Examples of the pad information 62*b* include "layout information" related to a layout of the operation pad 22 and "operation setting information" related to an operation setting of the operation pad 22.

The "layout information" described above includes arrangement relation (information) of one or a plurality of operation elements 34 of the operation pad 22. Examples of the arrangement relation (information) include a type, a position, a shape, an effective range, an effect accompanying an operation, and the like, of an operation element 34. The position of the operation element 34 may be represented by, for example, a relative position from a reference point (or a position in the pad coordinate system).

The "operation setting information" described above includes setting contents, which are related to an operation of the operation pad 22 and which can be set via the GUI of the touch device 14. Examples of the setting contents include sensitivity to a touch, enabling/disabling of an operation, customization of a key arrangement, an on/off state of a function of displaying a simulated image, a display color of the simulated image, a function allocation, an audiovisual effect accompanying an operation, and the like. In addition, in a case where the pad attachment 24 has a detachable structure, the setting contents may further include an attached position of the pad attachment 24.

The additional region information 62*c* is used in a case of providing an operating function to a specific region, which is part of a sensor region formed by the touch sensor 82 and different from a disposition region of the operation pad 22 (the specific region will hereinafter be referred to as an "additional region"). The additional region information 62*c* includes, for example, the position, size, or shape of the additional region, the type of the operating function, or setting contents related to the operating function. The additional region may be provided at a position in contact with the disposition region, or may be provided at a position separated from the disposition region. There may be one additional region or two or more additional regions.

The "operating function" described above may be a function related to the operation of the operation pad 22 (hereinafter referred to as a "related function"), or may be a function not related to the operation of the operation pad 22 (hereinafter referred to as a "non-related function").

Examples of the related function include a "complementing function" of complementing an operation using the operation pad 22. For example, in a case where a rectangular additional region extending in an upward-downward direction along a right side portion of the operation pad 22 is set, the display screen of the display panel 80 can be scrolled in the upward-downward direction through a swipe operation in the additional region by the user.

Examples of the non-related function include a "disabling function" of disabling a touch on the periphery of the operation pad 22. For example, in a case where a rectangular disabling region extending in a left-right direction along a lower side portion of the operation pad 22 is set, an erroneous operation triggered by a palm touch can be prevented at a time of an operation of the operation pad 22.

Operation of Input System 10

The input system 10 in the first embodiment is configured as described above. Next, an operation of the input system 10 will be described with reference to FIGS. 5 to 12.

Figure 5:
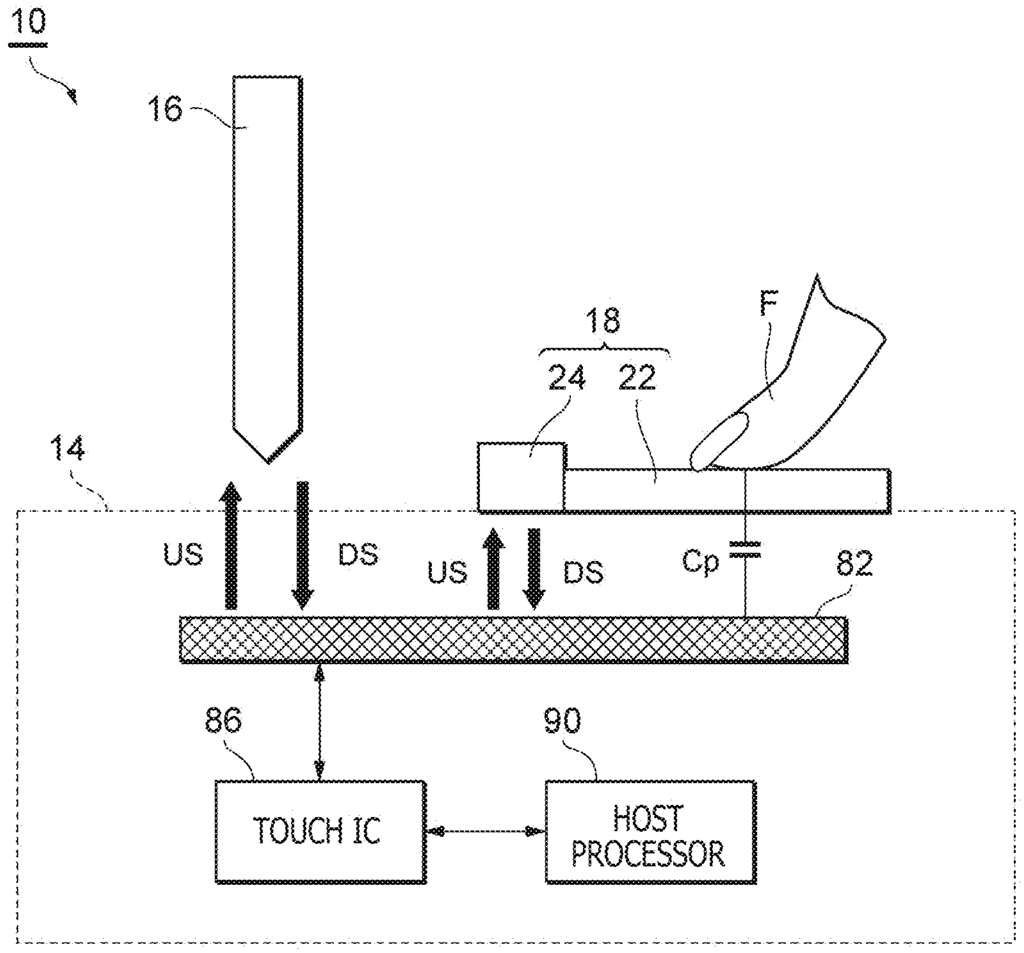
FIG. 5 is a diagram schematically illustrating a method of sharing pad information.

FIG. 5 is a diagram schematically illustrating a method of sharing the device information 62. In this sharing method, the pad attachment 24 provides the device information 62 retained in the pad attachment 24 to the touch device 14. The touch sensor 82, the touch IC 86, and the host processor 90 are illustrated as forming the touch device 14. The operation pad 22 and the pad attachment 24 are illustrated as forming the virtual input device 18.

First, the touch device 14 attempts a communication with an external device in the periphery of the touch device 14. The touch IC 86 of the touch device 14 generates an uplink signal US modulated by data necessary for a connection, and transmits the uplink signal US from the sensor electrodes which form the touch sensor 82. Thereafter, the electronic pen 16 or the pad attachment 24 receives the uplink signal US, and transmits a signal (a downlink signal DS) in response to the uplink signal US.

When the touch device 14 receives the downlink signal DS from the electronic pen 16 via the touch sensor 82, for example, a communication between the touch device 14 and the electronic pen 16 is established, and a communication in accordance with the AES system is started. Alternatively, when the touch device 14 receives the downlink signal DS from the pad attachment 24 via the touch sensor 82, a communication between the touch device 14 and the pad attachment 24 is established, and a communication in accordance with the AES system is started.

While the communication between the touch device 14 and the pad attachment 24 is performed, the host processor 90 of the touch device 14 obtains the device information 62 corresponding to the operation pad 22 through the reception of the downlink signal DS. The host processor 90 thereby operates to support the input function of the operation pad 22.

Figure 6:
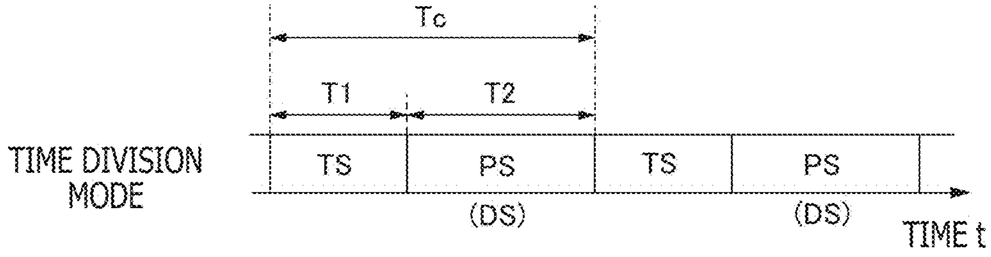
FIG. 6 is a diagram illustrating an example of an operation mode of a touch integrated circuit (IC) of FIG. 4 and FIG. 5.

FIG. 6 is a diagram illustrating an example of an operation mode of the touch IC 86 of FIG. 4 and FIG. 5. The touch IC 86 operates in a mode selected from a plurality of operation modes including a time division mode. The time division mode is an operation mode in which, for example, one touch scan (TS) and one pen scan (PS) are performed on a time-division basis. The "touch scan" refers to a scan operation for detecting a passive pointer (for example, a finger F in FIG. 5) that does not transmit a signal. The "pen scan" refers to a scan operation for detecting the electronic pen 16 that transmits the downlink signal DS.

The time slot of the touch scan is assigned a time length of T1 (unit: ms). The time slot of a global scan is assigned a time length of T2 (unit: ms). That is, [1] the touch scan having a time length of T1 and [2] the global scan having a time length of T2 constitute one operation unit (cycle: Tc=T1+T2).

In the time division mode described above, a scan operation for detecting the virtual input device 18, that is, a device scan (DS), is omitted. However, the time slot of the device scan may be added. The pad attachment 24 has a communication circuit configuration similar to that of the electronic pen 16. The touch IC 86 can therefore perform the device scan simultaneously with the execution of the pen scan.

Operation at Time of Touch Scan

Figure 7:
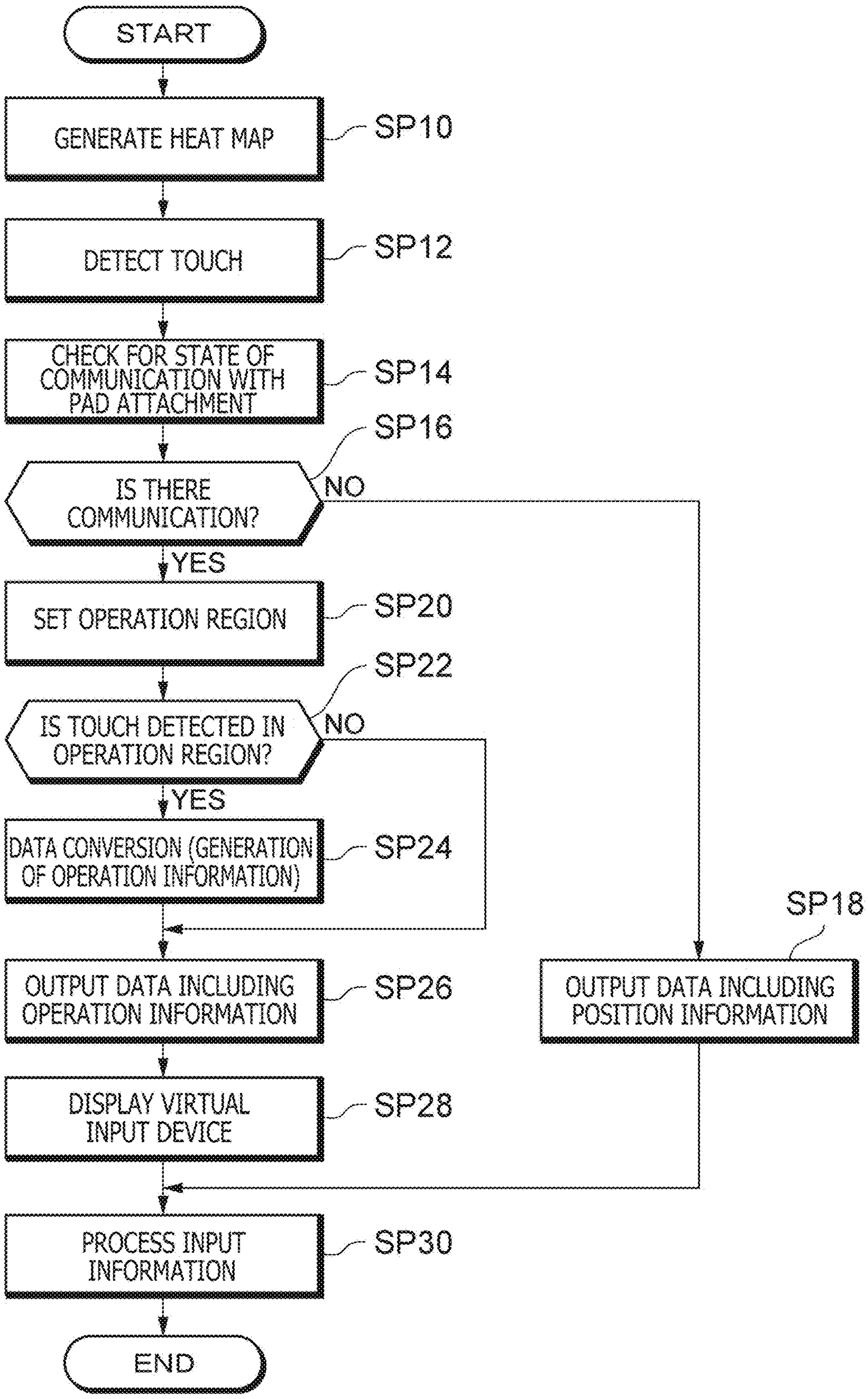
FIG. 7 is a flowchart related to a touch scan operation performed by the touch device of FIG. 4.

FIG. 7 is a flowchart related to a touch scan operation performed by the touch device 14 of FIG. 4. The touch IC 86 performs steps SP10 and SP12, and the host processor 90 performs steps SP14 to SP30.

In step SP10, the touch IC 86 generates a signal distribution correlated to an amount of change in capacitance (that is, a heat map) by sequentially performing the transmission of a signal to the X-line electrodes constituting the touch sensor 82 and the reception of a signal from the Y-line electrodes constituting the touch sensor 82.

In step SP12, the touch IC 86 performs analysis processing on the heat map generated in step SP10, to thereby detect a touch of the touch surface 20. The touch IC 86 outputs the presence or absence or the position of the touch (hereinafter referred to also as "position information") to the host processor 90.

In step SP14, the operation processing section 96 (more specifically, the device detecting section 98) of the host processor 90 checks for a state of communication with the pad attachment 24. Specifically, the device detecting section 98 checks whether or not the downlink signal DS from the pad attachment 24 is received at a time of the most recently performed pen scan.

When there is no communication with the pad attachment 24 in step SP16 (step SP16: NO), the operation processing section 96 assumes that the virtual input device 18 is not detected. The operation processing section 96 then proceeds to step SP18.

In step SP18, the operation processing section 96 refers to a detection result in step SP12, and supplies data including the position information to an operating system (hereinafter referred to as an "OS"). Then, the host processor 90 processes the supplied data, and performs an operation corresponding to a touch position on the touch surface 20 (step SP30).

Now, step SP16 is described again. When there is a communication with the pad attachment 24 (step SP16: YES), the operation processing section 96 assumes that the virtual input device 18 is detected. The operation processing section 96 then proceeds to step SP20.

In step SP20, the operation processing section 96 (more specifically, the coordinate value calculating section 99) sets an operation region R (FIG. 9) of the virtual input device 18. Prior to this setting, the coordinate value calculating section 99 obtains each of [1] detected positions of the first electrode 40 and the second electrode 42, and [2] the device information 62 corresponding to the pad attachment 24.

Figure 8:
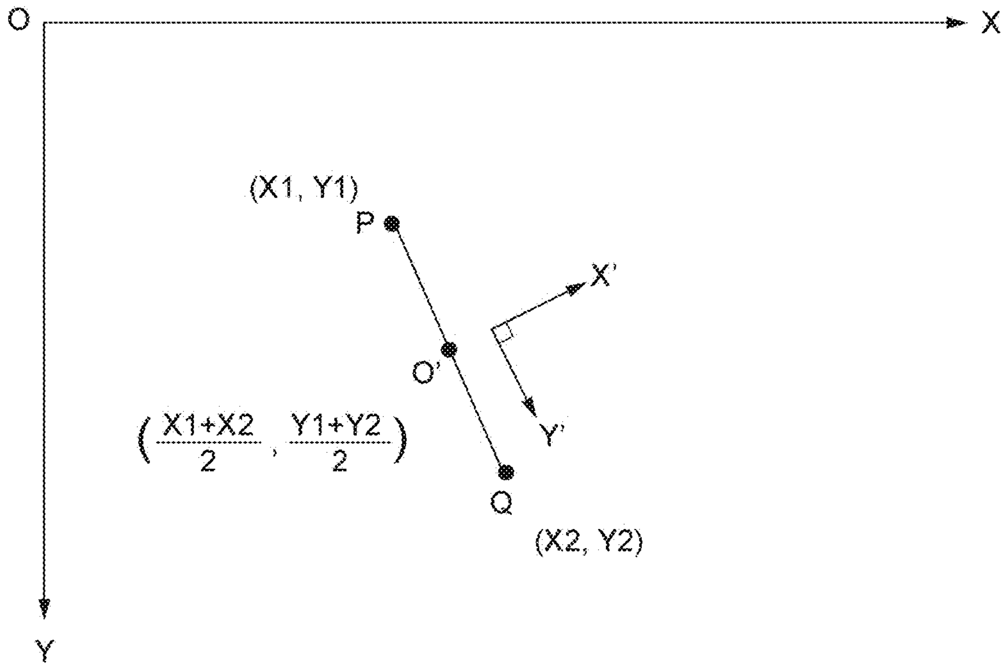
FIG. 8 is a first diagram illustrating a method of setting an operation region on an operation pad.

FIG. 8 is a first diagram illustrating a method of setting the operation region R of the operation pad 22. A given position on the touch surface 20 is defined in a rectangular sensor region ($0 \leq X \leq Xo$, $0 \leq Y \leq Yo$). For example, the detected position of the first electrode 40 is a point P (X1, Y1), and the detected position of the second electrode 42 is a point Q (X2, Y2).

Here, a plane coordinate system is defined in which a characteristic point ($\Delta X$, $\Delta Y$) of the pad attachment 24 is set as an origin O' (hereinafter referred to as a pad coordinate system X'-Y'). For example, the origin O' of the pad coordinate system is set at a middle point between the two points P and Q. In this case, (ΔX, ΔY) is obtained by calculation equations ΔX=(X1+X2)/2 and ΔY=(Y1+Y2)/2. The X' axis of the pad coordinate system is set in a direction orthogonal to a line segment PQ, and the Y' axis of the pad coordinate system is set in a direction parallel with the line segment PQ.

Figure 9:
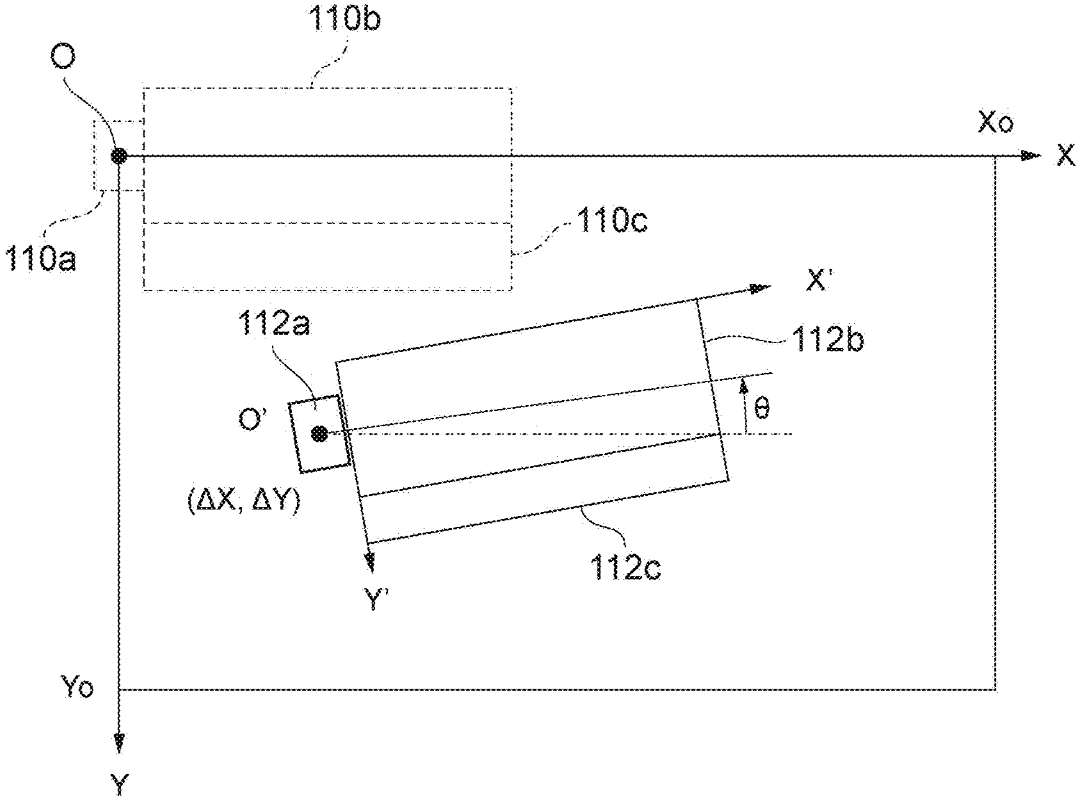
FIG. 9 is a second diagram illustrating the method of setting the operation region of the operation pad.

FIG. 9 is a second diagram illustrating the method of setting the operation region R of the operation pad 22. Specifically, FIG. 9 illustrates a relative positional relation between reference regions 110*a*, 110*b*, and 110*c* and detected regions 112*a*, 112*b*, and 112*c*. The reference region 110*a* and the detected region 112*a* each represent a presence range of the pad attachment 24. The reference region 110*b* and the detected region 112*b* each represent a presence range of the operation pad 22. The reference region 110*c* and the detected region 112*c* each represent a presence range of an additional region (for example, a touch disabled area). Here, suppose that the origin O' is shifted in position by (ΔX, ΔY) with respect to the origin O, and that the X' axis (Y' axis) is inclined by an angle θ with respect to the X-axis (Y-axis). In this case, the detected region 112*b* is set as the operation region R of the virtual input device 18.

In step SP22 in FIG. 7, the coordinate value calculating section 99 checks whether or not there is at least one touch position in the operation region R set in step SP20. When there is no touch position in the operation region R (step SP22: NO), the operation processing section 96 omits the execution of step SP24, and proceeds to step SP26. Operation of step SP24 will be described later.

In step SP26, the host processor 90 processes data including operation information, to be described later, and performs an operation corresponding to the touch position on the touch surface 20. When the execution of step SP24 is omitted, the host processor 90 performs an operation similar to step SP18.

In step SP28, the host processor 90 performs control to display an image simulating the operation pad 22 on the touch panel display 12. Specifically, the host processor 90 reads a template (image data) of the operation pad 22 from the memory 92, then performs image processing according to a conversion parameter, and thereafter outputs the processed image data as display data to the display panel 80.

Figure 10:
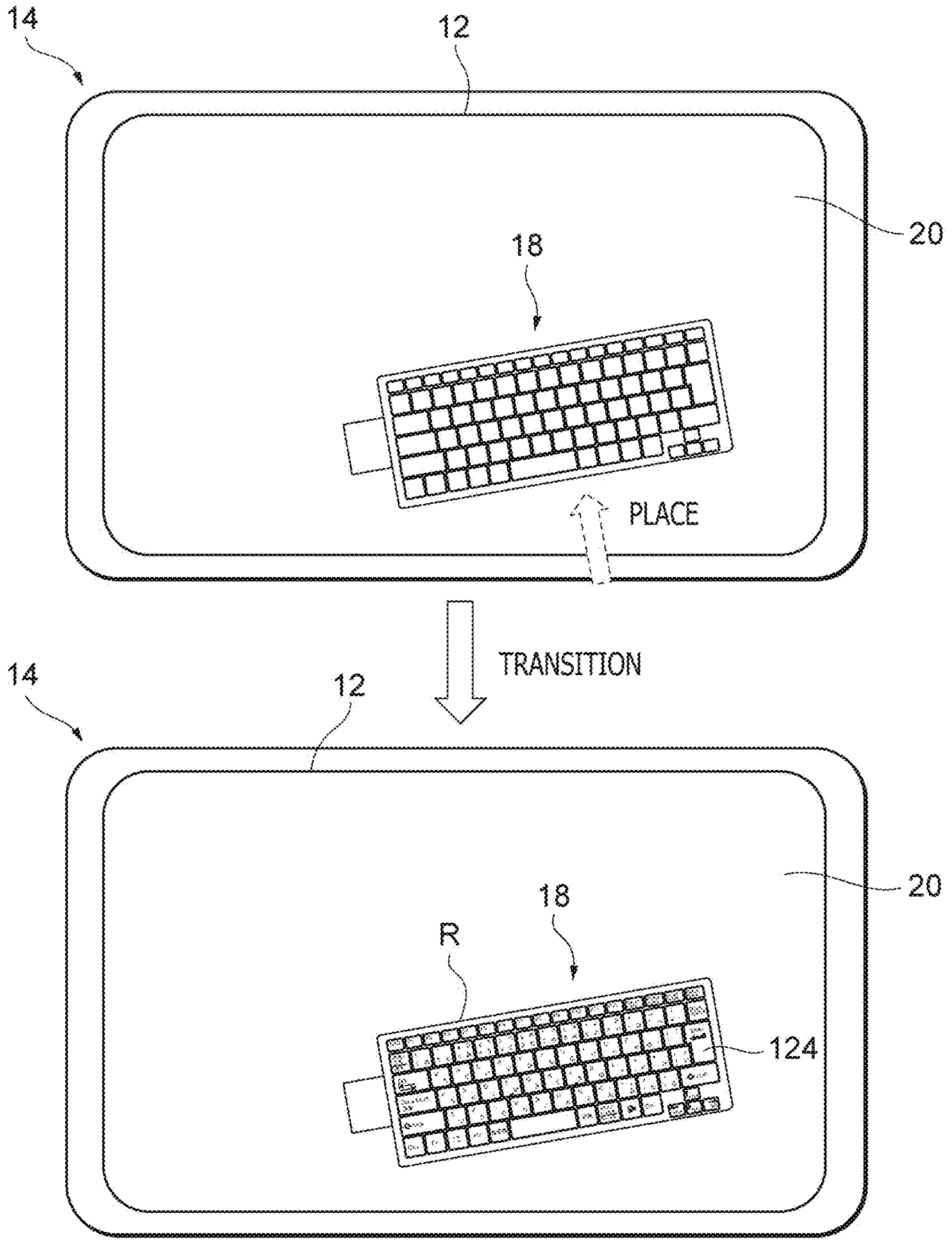
FIG. 10 is a diagram of a screen transition of a touch panel display in accordance with a change in the disposition of the virtual input device.

FIG. 10 is a diagram of a screen transition of the touch panel display 12 in accordance with a change in the disposition (placement) of the virtual input device 18. Suppose that, as illustrated in the upper side of FIG. 10, the user disposes (places), on the touch surface 20, the virtual input device 18 in a position and an orientation suitable with the touch device 14 in use at a time of starting to use the virtual input device 18. Then, triggered by a start of a communication, a transition is made from a display state illustrated in the upper side of FIG. 10 to a display state illustrated in the lower side of FIG. 10. That is, the characters or indicia for the operation pad 22 are displayed on the touch panel display 12 of the touch device 14, which are visible to the user through the operation pad 22 made of a transparent or semitransparent material.

As illustrated in the lower side of FIG. 10, an image simulating a character keyboard (hereinafter, referred to as a simulation image 124) is displayed in a position coinciding with the operation pad 22 (in the operation region R in FIG. 9 in this case). The simulation image 124 is formed by characters that are two-dimensionally arranged according to a desired key arrangement, wherein the characters indicate the types of the operation elements 34 of the operation pad 22. In other words, the virtual input device 18 performs an input function as a pseudo “character keyboard.”

By repeatedly performing the flowchart of FIG. 7, the touch device 14 maintains a state in which the virtual input device 18 remains usable. When the disposition of the virtual input device 18 is desired to be adjusted, the user moves the virtual input device 18 to a desired position or orientation. Then, the pad attachment 24 is detected in a state in which the position or the orientation is changed, and as a result, the simulation image 124 is displayed in a manner to follow the movement of the virtual input device 18.

Figures 11, 12:
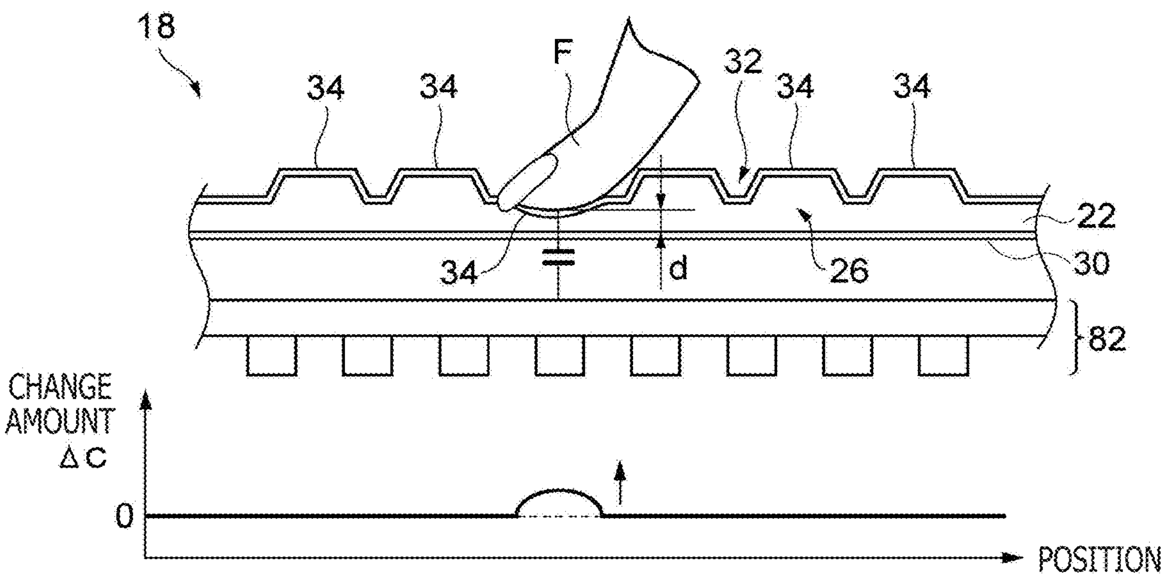
FIG. 11 is a diagram schematically illustrating an operation state of the virtual input device.
FIG. 12 is a diagram illustrating an example of a data structure of the pad information of FIG. 4.

FIG. 11 is a diagram schematically illustrating an operation state of the virtual input device 18. Specifically, FIG. 11 is a diagram schematically illustrating a change in the heat map in a case where the finger F of the user depresses one operation element 34 of the operation pad 22. When the finger F approaches the touch sensor 82 (e.g., the finger F is separated by a distance “d” from the flat back surface 30 of the operation pad 22), a capacitance at the position of the finger F changes to a positive side. When a peak value of the change exceeds a threshold value, the peak is detected as a touch position.

Then, a touch is detected in the operation region R in step SP22 in FIG. 7 (step SP22: YES). The operation processing section 96 therefore proceeds to the next step SP24.

In step SP24, the operation processing section 96 (more specifically, the coordinate value calculating section 99 and the operation identifying section 100) performs data conversion processing of converting the touch position in the operation region R detected in step SP22 into the type of the operation element 34 of the operation pad 22. A method of this data conversion will be described in detail with reference to FIG. 12.

FIG. 12 is a diagram illustrating an example of a data structure of the pad information 62*b* of FIG. 4. The pad information 62*b* is table data associated with the type of the operation pad 22. The pad information 62*b* describes a correspondence relation between range information indicating an effective range of operation (that is, a range of a small region) and the type of the operation element 34. In a case where the shape of the effective range is a quadrangular shape, for example, the range information is formed of positions in the pad coordinate system which represent four vertices (for example, P001→P002→P003→P004→P001). The types of operation elements 34 include, for example, alphabetic characters such as Q, W, E, R, and T, numbers such as 1, 2, and 3, modifier keys such as Enter and Shift, and direction keys such as ↓ (down) and → (right).

The coordinate value calculating section 99 converts a coordinate value indicating the touch position (that is, a touch coordinate value) from the sensor coordinate system X-Y to the pad coordinate system X'-Y' by affine transformation using three conversion parameters (ΔX, ΔY, θ) calculated in step SP20. Then, the operation identifying section 100 refers to the pad information 62*b*, identifies an effective range to which the touch coordinate value obtained after the affine transformation belongs, and obtains a type of operation element 34 associated with the corresponding effective range. In a case where coordinates obtained after the conversion belong to an effective range surrounded, for example, by P017 to P020, “T” is obtained as the type of the operation element 34.

In step SP26 in FIG. 7, the operation processing section 96 generates data including information indicating the operation state of the virtual input device 18 (operation information), and supplies the data to the OS. Here, unlike in the case of step SP18, the operation information is output in place of the position information.

Suppose that, when the user ends the use of the virtual input device 18, the user removes the virtual input device 18 and returns the virtual input device 18 to a place separated from the touch panel display 12. Then, triggered by the end of a communication, the display of the simulation image 124 illustrated in FIG. 10 ends.

Thus, a combination of the touch device 14 and the virtual input device 18 described above can be used in place of a capacitive non-contact type keyboard. It is therefore possible to realize [1] a reduction in product cost, [2] a new user interface (UI) experience, [3] expansion of use cases, [4] effective use of the touch device 14, [5] simplifying customization, and the like.

Summary of First Embodiment

As described above, the input system 10 of the first embodiment includes the touch device 14, which includes the capacitive type touch sensor 82, and the virtual input device 18 used in conjunction with the touch device 14. The virtual input device 18 includes the operation pad 22 including at least one physical operation element 34 and the pad attachment 24 attached to the operation pad 22.

The pad attachment 24 includes the memory 60 that stores the device information 62 related to the virtual input device 18, one or more communication elements (electrodes in the illustrate example) for performing wireless communication with the touch device 14 via the touch sensor 82, and the transmitting circuit 58 that transmits, via the one or more electrodes, a transmission signal including the device information 62 read from the memory 60.

With such a configuration, it is possible to provide the device information 62 retained in the pad attachment 24 to the touch device 14, without providing a special structure in the operation pad 22. It is therefore possible to improve the degree of freedom in designing the operation pad 22 which forms the virtual input device 18.

The device information 62 may include the pad information 62*b* such as the type of the operation pad 22, the arrangement of the physical operation elements 34, or the setting contents related to the operation of the operation pad 22. Thus, the touch device 14 can, based on obtaining the pad information 62*b*, assign any desired input function to the operation pad 22.

In a case of assigning an operating function to an additional region that is part of the sensor region formed by the touch sensor 82 and that is different from a region in which the operation pad 22 is disposed, the device information 62 may include the additional region information 62*c* such as the type of the operating function, the position, size, or shape of the additional region, or the setting contents related to the operating function. The touch device 14 can, based on obtaining the additional region information 62*c*, assign a desired operating function to the additional region different from the operation region of the operation pad 22.

The device information 62 may include identification information of the virtual input device 18, the operation pad 22, or the pad attachment 24. The touch device 14 can thereby identify the virtual input device 18, the operation pad 22, or the pad attachment 24 using a smaller amount of data.

The operation pad 22 may be configured to, when the user depresses the physical operation element 34 from the top surface 28 side in a state in which the operation pad 22 is disposed on the touch device 14, produce a capacitance change at a part of the touch sensor 82 corresponding to the position of the physical operation element 34 when the user's finger or other conductor material approaches the part.

In this case, a processor (the touch IC 86 or the host processor 90), while a wireless communication is performed between the processor and the pad attachment 24, may generate or output data in accordance with a capacitance change in the operation region R which is set according to the detected position(s) of one or more electrodes. The data, which is generated or output, includes operation information indicating an operation state of the operation pad 22, wherein the operation information is different from the position information indicating the detected position(s). It is therefore possible to output information corresponding to the operation performed by the user.

Modifications

Figure 13:
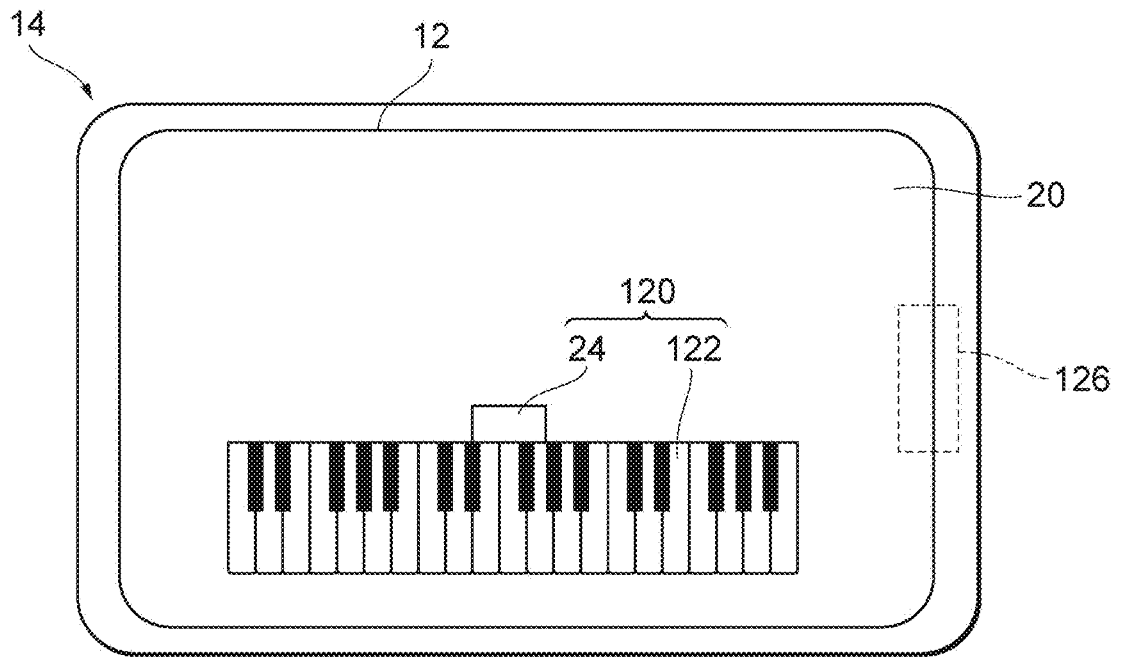
FIG. 13 is a plan view of a virtual input device according to a first modification of the first embodiment.

FIG. 13 is a plan view of a virtual input device 120 according to a first modification of the first embodiment. The example of FIG. 13 represents a state in which the virtual input device 120 is disposed on the touch surface 20 of the touch device 14. The virtual input device 120 includes an operation pad 122 and a pad attachment 24. The operation pad 122 has a three-dimensional shape simulating a form (shape and color) of an electronic (music) keyboard. The pad attachment 24 is provided in such a manner as to be attachable to and detachable from a side portion (a top portion in a plan view of FIG. 13) of the operation pad 122.

The user depresses an operation element of the operation pad 122 (a key of the electronic keyboard) in a state in which the virtual input device 120 is disposed on the touch surface 20 of the touch device 14. Then, the touch device 14 outputs a sound corresponding to the pressed key from a speaker 126. The virtual input device 18 thus exerts an input function as a pseudo "electronic piano."

The form of the operation pad or the effects of the operation pad may thus be changed freely according to the use of the virtual input device. Other examples of the virtual input device include numeric keys, a trackpoint, a creative controller, a game controller, a finger drum, a magnet device, a mass storage device, or the like.

The operation pad 122 is not limited to having only a transparent color or a semitransparent color, and at least a part of the top surface 28 or the back surface 30 may have a non-transparent color. For example, in a case where the entire operation pad 122 is colored so as to simulate an actual object, the simulation image does not have to be displayed in the operation region R of the touch panel display 12 located directly under the operation pad 122.

Figure 14:
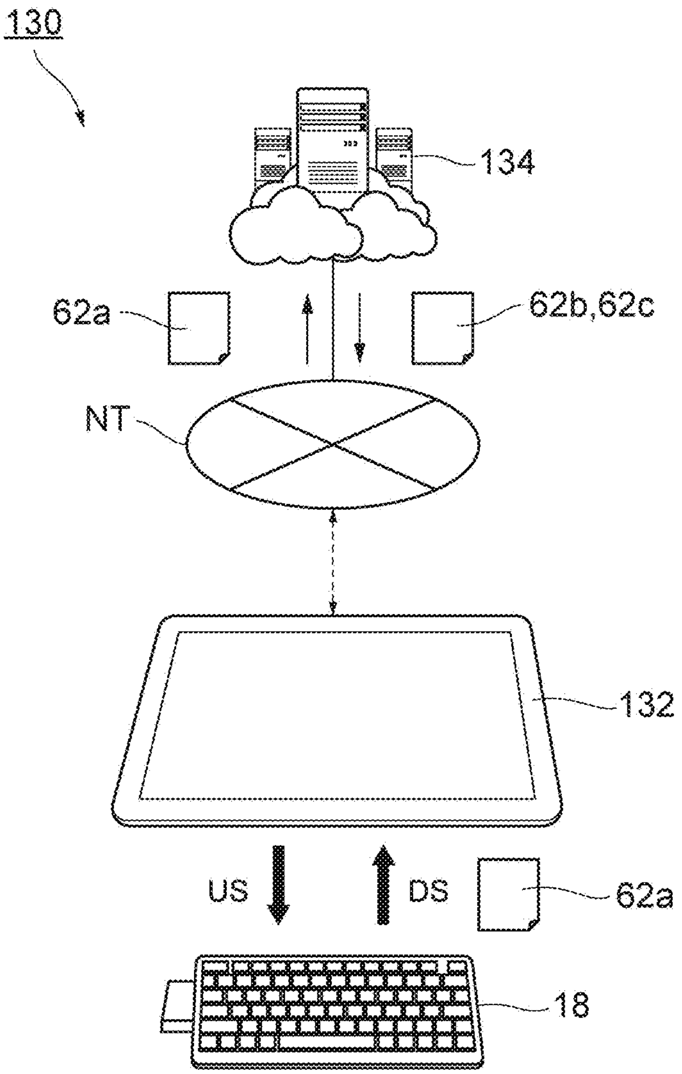
FIG. 14 is a general configuration diagram of an input system according to a second modification of the first embodiment.

FIG. 14 is a general configuration diagram of an input system 130 according to a second modification of the first embodiment. The input system 130 includes the virtual input device 18, a touch device 132, and a server device 134. The touch device 132 can bi-directionally communicate with the server device 134 via a network NT.

In an initial state, the virtual input device 18 holds the device ID 62*a* of the device information 62. The touch device 132 does not hold the device information 62 corresponding to the virtual input device 18. The server device 134 holds the device ID 62*a*, the pad information 62*b*, and the additional region information 62*c* of the device information 62 corresponding to the virtual input device 18. In this case, the device information 62 can be shared as follows.

First, when a communication between the touch device 132 and the virtual input device 18 is started, the touch device 14 obtains the device ID 62*a* corresponding to the virtual input device 18 through the reception of the downlink signal DS. Then, the touch device 14 transmits a signal including the device ID 62*a* (a request signal for the device information 62) to the server device 134.

The server device 134 receives the request signal from the touch device 132 via the network NT, and transmits a response signal including the pad information 62*b* and the additional region information 62*c* corresponding to the device ID 62*a* to the touch device 132 via the network NT. The touch device 132 can obtain the pad information 62*b* and the additional region information 62*c* corresponding to the virtual input device 18 by receiving the response signal from the server device 134 via the network NT.

Thus, the host processor 90 of the touch device 132 may obtain the identification information of the operation pad 22 (the device ID 62*a*) by wireless communication with the pad attachment 24, and acquire the arrangement of the physical operation elements 34 or setting contents related to the operation of the operation pad 22 corresponding to the device ID 62*a*, by communication with an external device (the server device 134 in this case) different from the pad attachment 24. Hence, the device information 62 can be retained in a manner distributed amongst a plurality of devices (the virtual input device 18 and the server device 134 in this case). The pad attachment 24 thus needs to retain a small amount of data.

Figure 15:
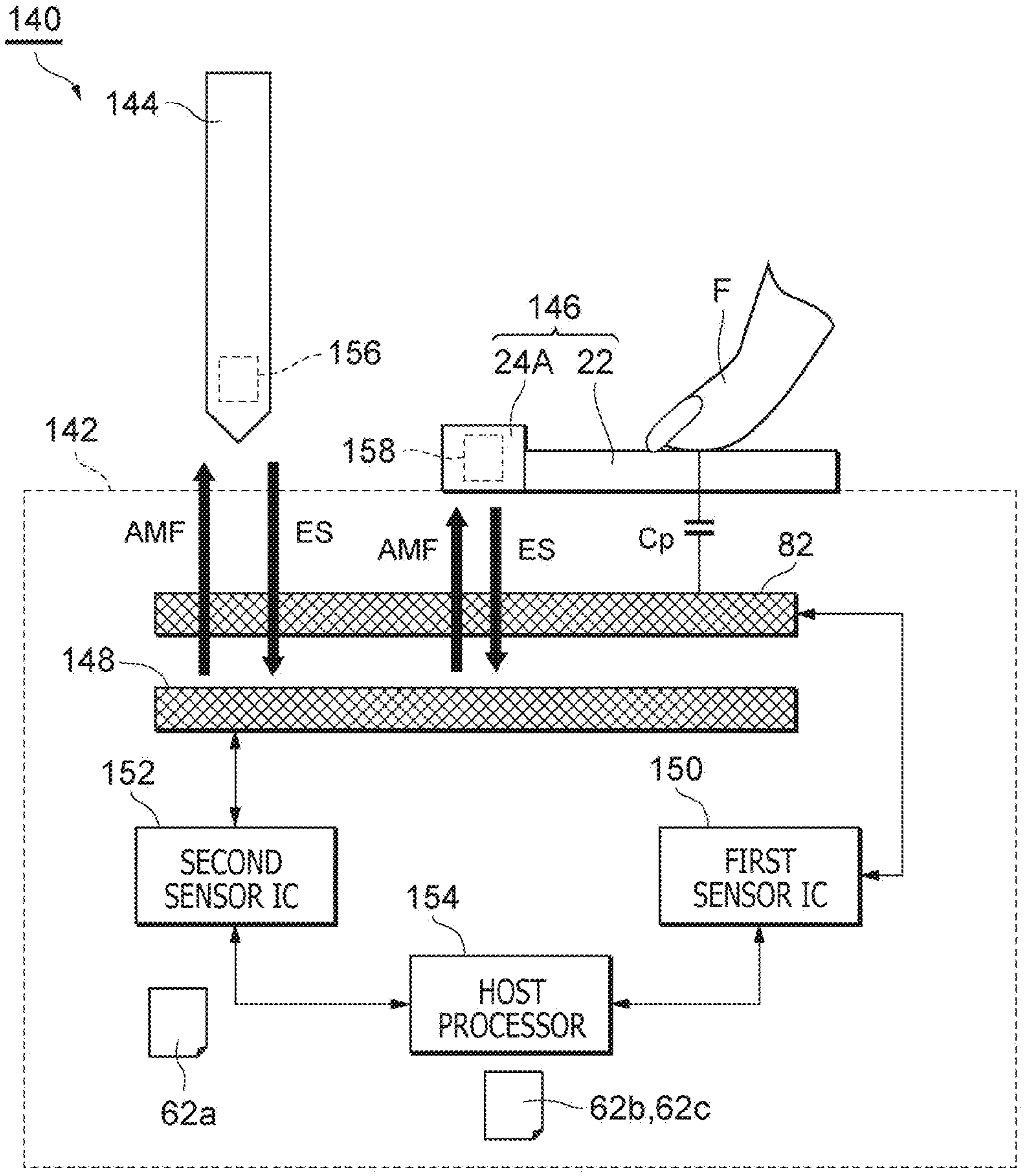
FIG. 15 is a general configuration diagram of an input system according to a third modification of the first embodiment.

FIG. 15 is a general configuration diagram of an input system 140 according to a third modification of the first embodiment. The input system 140 includes a touch device 142, an electronic pen 144, and a virtual input device 146.

The electronic pen 144 is an electromagnetic resonance (EMR) type stylus that detects an alternating magnetic field sent from the electronic pen 144, through a plurality of detection coils which are arranged two-dimensionally. A pen tip of the electronic pen 144 is provided with a coil 156 (corresponding to a "communication element") that generates and transmits an induced signal. In the following, the magnetic field generated by an exciting signal will be referred to as an "alternating magnetic field AMF," and the signal output from the coil 156 according to the alternating magnetic field AMF will be referred to as an "EMR signal ES."

The virtual input device 146 includes the operation pad 22 (FIG. 2) and a pad attachment 24A, which is different in configuration from the pad attachment 24 of the first embodiment. As with the electronic pen 144, the pad attachment 24A has an EMR system communicating function. The pad attachment 24A is provided with a coil 158 that generates and transmits an induced signal.

The touch device 142 includes, in addition to the touch sensor 82 described above, an EMR sensor 148, a first sensor IC 150, a second sensor IC 152, and a host processor 154. Here, the EMR sensor 148 is a planar sensor different from the touch sensor 82, and is formed of a plurality of detection coils which are two-dimensionally arranged.

The first sensor IC 150 is an IC that is electrically connected to the touch sensor 82 and performs driving control of the touch sensor 82. The second sensor IC 152 is an IC that is electrically connected to the EMR sensor 148 and performs driving control of the EMR sensor 148. The host processor 154 exchanges various types of data with the first sensor IC 150 or the second sensor IC 152.

In an initial state, the virtual input device 146 holds the device ID 62*a* of the device information 62. The touch device 142 holds the device ID 62*a*, the pad information 62*b*, and the additional region information 62*c* of the device information 62 corresponding to the virtual input device 146. In this case, the device information 62 can be shared as follows.

First, the touch device 142 attempts a communication with an external device present in the vicinity of the touch device 142. The second sensor IC 152 of the touch device 142 supplies an exciting signal to a power coil forming a part of the EMR sensor 148 to thereby generate an alternating magnetic field AMF. Thereafter, the electronic pen 144 or the pad attachment 24A, via the coil 156 or 158 through which the alternating magnetic field AMF passes, generates and transmits the EMR signal ES.

When the touch device 142 receives the EMR signal ES from the electronic pen 144 via the EMR sensor 148, for example, a communication between the touch device 142 and the electronic pen 144 is established, and a communication in accordance with the EMR system is started. Alternatively, when the touch device 142 receives the EMR signal ES from the pad attachment 24A via the EMR sensor 148, a communication between the touch device 14 and the pad attachment 24A is established, and a communication in accordance with the EMR system is started.

While the communication between the touch device 142 and the pad attachment 24A is performed, the host processor 154 of the touch device 142 obtains, through the reception of the EMR signal ES, the device information 62 corresponding to the operation pad 22 from the second sensor IC 152. The host processor 154 thus supports the operation pad 22 performing the input function.

In this manner, the touch device 142 and the pad attachment 24A may exchange the device information 62 via a communication in accordance with the EMR system instead of the AES system. Also, the touch device 142 and the pad attachment 24A may exchange the device information 62 by using not only the AES system or the EMR system, but also another wireless communication system such as a Bluetooth (registered trademark) communication system.

In the case of the EMR system, a part or the entirety of the EMR sensor 148 may be incorporated into another member constituting the touch device 142. For example, a transmission coil (or the power coil) of the EMR sensor 148 may be integrally formed in or on a light source panel of the display panel 80, and the detection coils of the EMR sensor 148 may be integrally formed in or on the touch sensor 82.

Figure 16:
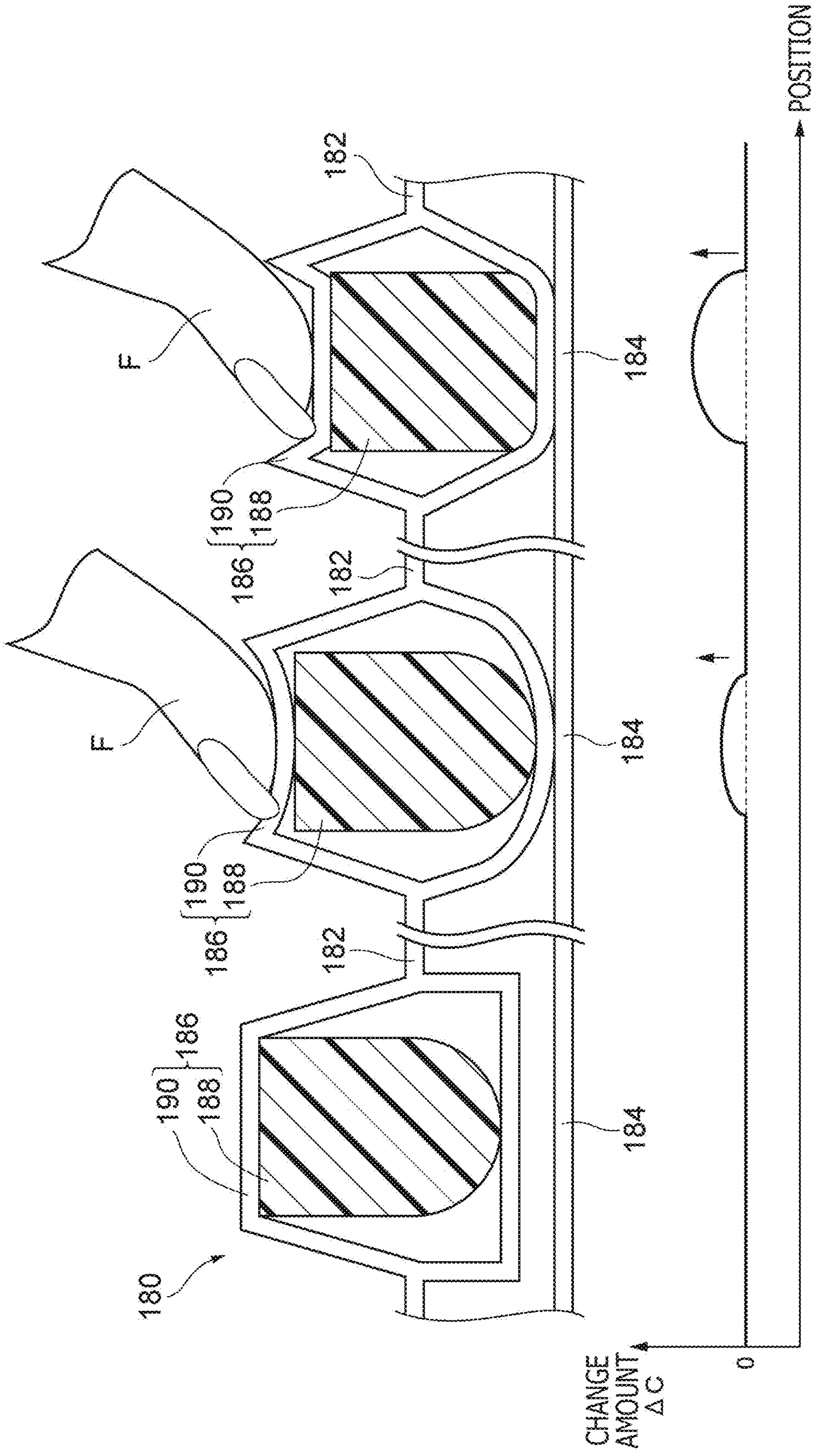
FIG. 16 is a sectional view of a virtual input device according to a fourth modification of the first embodiment.

FIG. 16 is a sectional view of an operation pad 180 according to a fourth modification of the first embodiment. The operation pad 180 includes a material (for example, a resin material) that has a transparent or semitransparent color and that has nonconductivity and elasticity. The operation pad 180 is elastically deformed when an external force is applied to the operation pad 180, and the operation pad 180 can be restored to its original shape when the external force is removed. As in the case of the operation pad 22 (FIG. 2 and FIG. 11) of the first embodiment, the operation pad 180 has a top surface 182 having projections and depressions formed thereon and a flat back surface 184. The top surface 182 of the operation pad 180 is provided with one or a plurality of operation elements 186.

Each of the operation elements 186 is formed of an operation member 188 and a housing portion 190 that houses the operation member 188. The operation member 188 is formed in a bell shape of a material having conductivity and elasticity (for example, conductive urethane or conductive silicon rubber). During non-operation of the operation element 186, the housing portion 190 houses the operation member 188 while holding the operation member 188 in a position separated from the back surface 184.

As in the case of FIG. 11, FIG. 16 schematically illustrates a change in the heat map in a case where the finger F of the user depresses one operation element 186 of the operation pad 180. When the finger F depresses the operation element 186, the operation member 188 approaches the touch sensor 82 (not illustrated), and the heat map changes to a positive side at the position of the operation member 188. When the operation element 186 is thereafter further depressed, a lower end of the operation member 188 abuts against the back surface 184, and the height and width of a peak of the heat map both increase due to an elastic deformation of the operation member 188.

Thus, the operation pad 180 is not limited to a material having non-conductivity, and at least a part of the top surface 182 or the back surface 184 may be provided with a conductor. Specifically, when the operation element 186 includes an operation member having conductivity and elasticity, it is possible to [1] improve structural integrity of the operation element 186, [2] improve sensitivity of a touch operation, or [3] detect an operation by the finger F wearing a glove.

Second Embodiment

An input system 200 according to a second embodiment will next be described with reference to FIGS. 17 to 22.

General Configuration of Input System 200

Figure 17:
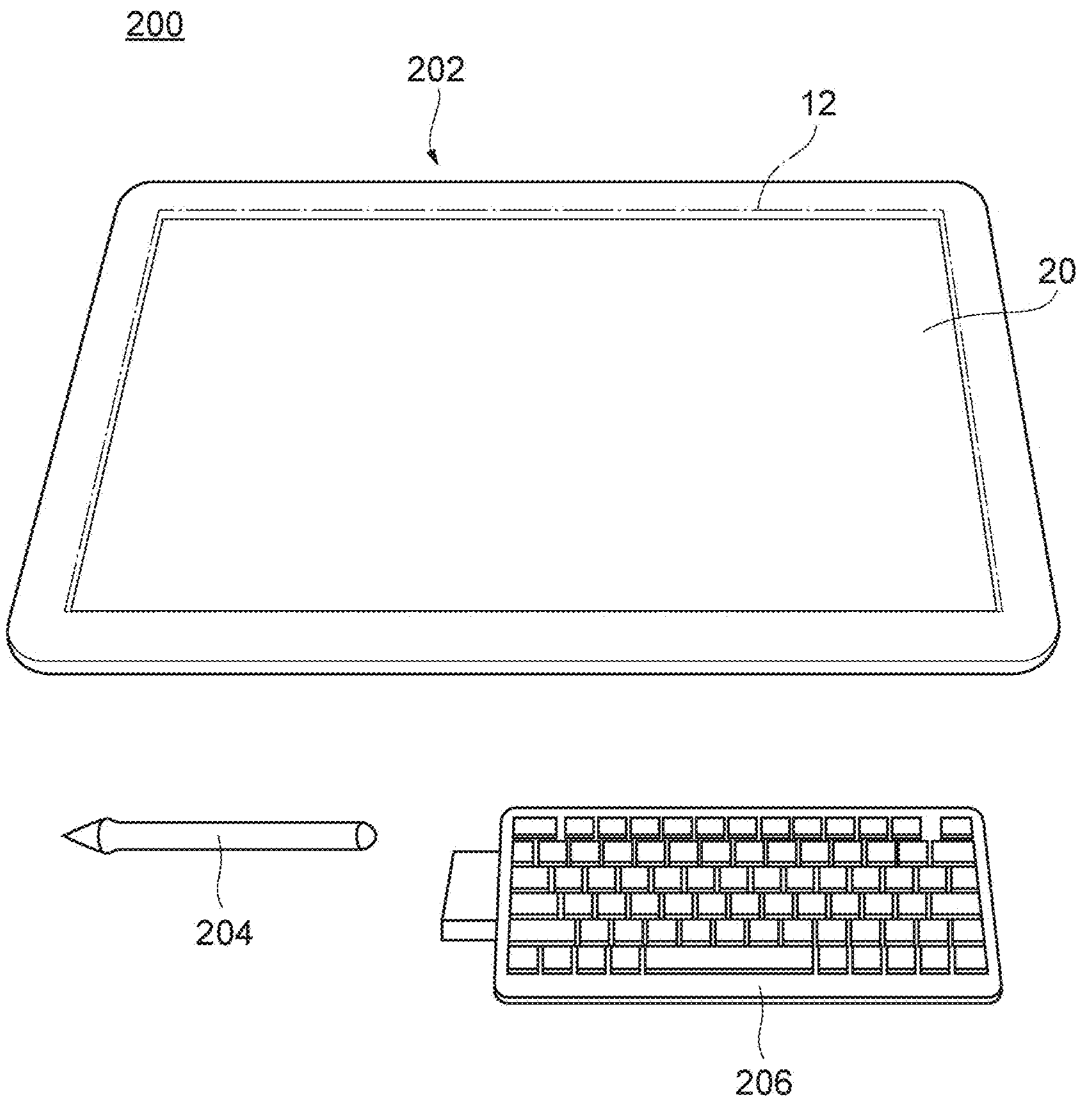
FIG. 17 is a general configuration diagram of an input system according to a second embodiment of the present disclosure.

FIG. 17 is a general configuration diagram of the input system 200 according to the second embodiment of the present disclosure. The input system 200 is basically formed of a touch device 202 including the touch panel display 12, an electronic pen 204 which is a pen type pointing device, and a virtual input device 206 that can be freely disposed (placed) on the touch device 202.

As with the touch device 14 of the first embodiment, the touch device 202 is formed of a tablet terminal, a smart phone, a laptop, or a personal computer that has/does not have a display function. As with the electronic pen 16 of the first embodiment, the electronic pen 204 is configured to be able to communicate unidirectionally or bidirectionally with the touch device 202.

As with the virtual input device 18 of the first embodiment, the virtual input device 206 is a pseudo physical device that performs an input, which corresponds to an operation performed by the user, to the touch device 202. Specifically, the virtual input device 206 includes the operation pad 22 (FIG. 2) and a pad attachment 24B (FIG. 18) different in configuration from the pad attachment 24 of the first embodiment.

Configuration of Pad Attachment 24*b*

Figure 18:
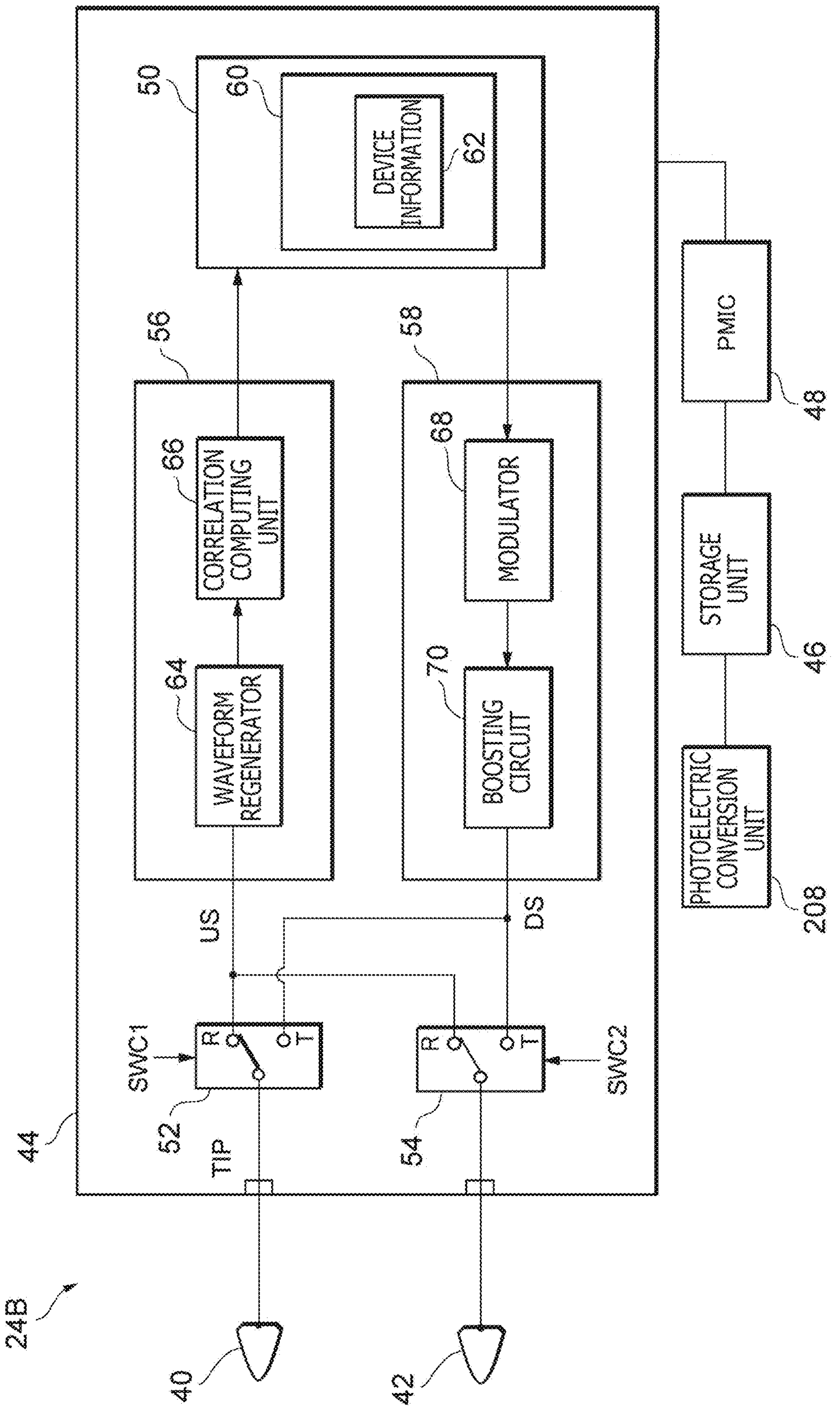
FIG. 18 is a block diagram illustrating an example of a configuration of a pad attachment of the second embodiment.

FIG. 18 is a block diagram illustrating an example of a configuration of the pad attachment 24B according to the second embodiment. The pad attachment 24B includes a photoelectric conversion unit 208 in addition to a configuration similar to that of the pad attachment 24 (FIG. 3) of the first embodiment.

The photoelectric conversion unit 208 converts external light into electric energy, and supplies the electric energy to the storage unit 46. The photoelectric conversion unit 208 is constituted by a solar battery, for example. The external light may be either [1] display light of the touch device 202, [2] illumination light different from light from the touch device 202, or [3] an optical signal used for optical wireless communication with the touch device 202. Examples of the optical wireless communication include light fidelity (Li-Fi) communication using ultraviolet rays, infrared rays, or visible light.

Configuration of Touch Device 202

Figure 19:
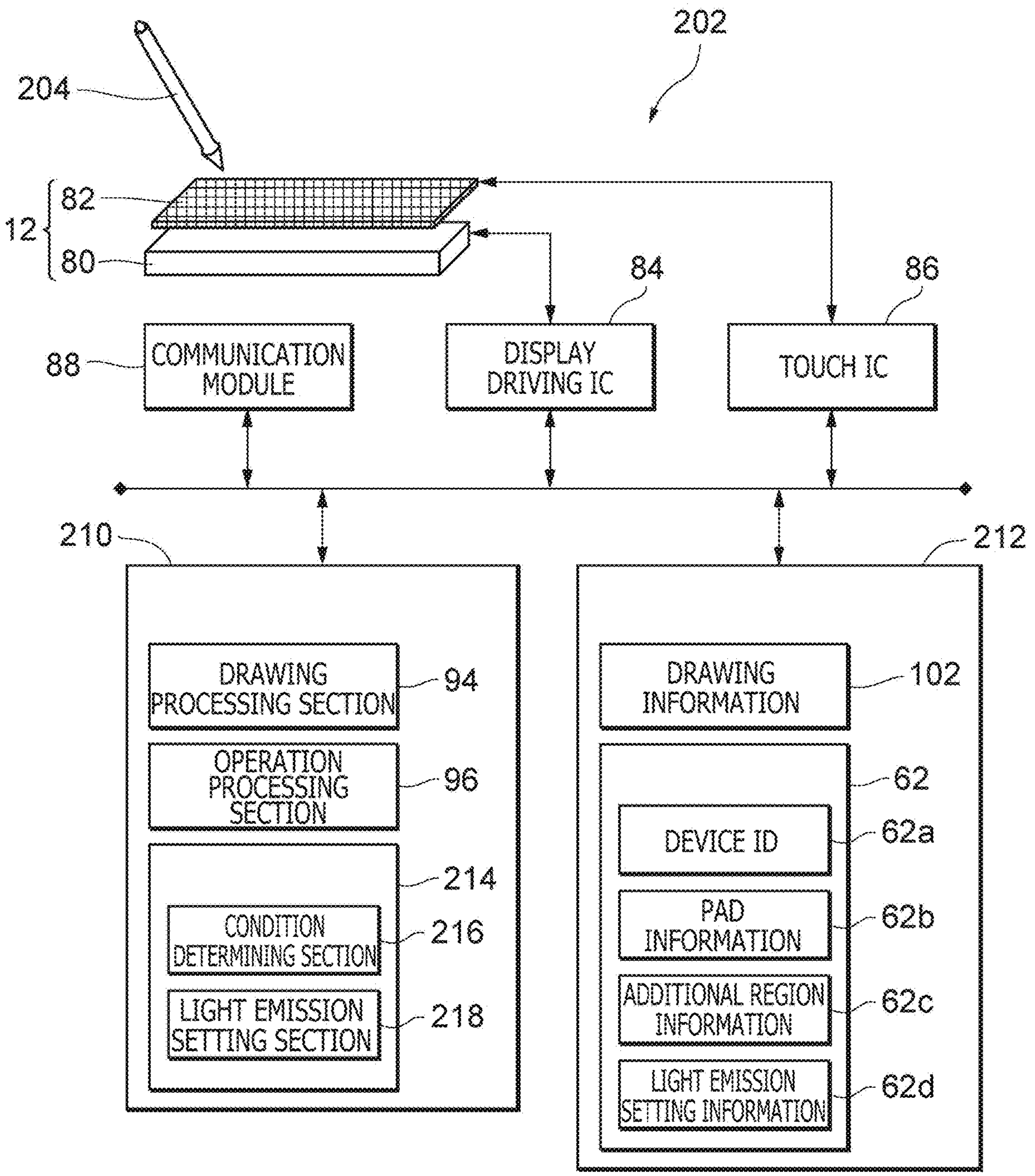
FIG. 19 is a block diagram illustrating an example of a configuration of a touch device of FIG. 17.

FIG. 19 is a block diagram illustrating an example of a configuration of the touch device 202 of FIG. 17. The touch device 202 includes the touch panel display 12, the display driving IC 84, the touch IC 86, and the communication module 88*a*. The touch device 202 also includes a host processor 210 and a memory 212 that are each different in function from those of the first embodiment.

As with the host processor 90 (FIG. 4) in the first embodiment, the host processor 210 is constituted by an arithmetic processing device including a CPU, a GPU, or an MPU. The host processor 210 functions as the drawing processing section 94 and the operation processing section 96, and additionally as a light emission control section 214, by reading and executing a program and data stored in the memory 212.

The light emission control section 214 controls light emission of the display panel 80 via the display driving IC 84. The light emission control section 214 specifically includes a condition determining section 216 and a light emission setting section 218.

The condition determining section 216 determines whether or not a condition related to the enabling or disabling of charging of the pad attachment 24B (hereinafter referred to also as a "chargeable condition") is satisfied. Examples of the chargeable condition include [1] detection of a communication with the pad attachment 24B, [2] detection of a contact of the virtual input device 206 with the touch surface 20, [3] detection of a user's intention not to use the touch device 202 or the virtual input device 206, and the like.

The light emission setting section 218 sets a condition related to the light emission of the display panel 80 (hereinafter referred to as a "light emission condition") when the condition determining section 216 determines that the chargeable condition is satisfied. The light emission condition includes a "range condition" related to a light emission range, a "color condition" related to a light emission color, or an "intensity condition" related to light emission intensity.

The light emission setting section 218 may set the light emission range according to the detected position of the pad attachment 24B or the photoelectric conversion unit 208. In this case, for example, the light emission range is set to include the presence region of the pad attachment 24B. In a case where the position of the photoelectric conversion unit 208 is known, the light emission range may be set to include the presence region of the photoelectric conversion unit 208.

The light emission setting section 218 may set the light emission color according to the type of the pad attachment 24B or the photoelectric conversion unit 208. In this case, for example, the light emission color is set to include a large amount of a wavelength component for which the photoelectric conversion efficiency of the photoelectric conversion unit 208 is relatively high, and to include a small amount of wavelengths for which the photoelectric conversion efficiency of the photoelectric conversion unit 208 is relatively low. When content is displayed in the presence region of the pad attachment 24B, the color in the vicinity of the presence region is gradually changed to avoid appearing visually strange to a user.

The light emission setting section 218 may set the light emission intensity according to a power supply remaining capacity of the storage unit 46 or a type of a set charging mode. In this case, for example, the light emission intensity is set to be high when the power supply remaining capacity of the storage unit 46 is relatively low, and is set to be low when the power supply remaining capacity of the storage unit 46 is relatively high. When a rapid charging mode is set, the light emission intensity may be set to be high as compared with a case of a normal charging mode.

The memory 212 is constituted by a non-transitory and computer readable storage medium. In the example of FIG. 19, as with the memory 92 in the first embodiment, the memory 212 stores the drawing information 102 and the device information 62. In the example of FIG. 19, the device information 62 further includes light emission setting information 62*d* in addition to the device ID 62*a*, the pad information 62*b*, and the additional region information 62*c*.

The light emission setting information 62*d* includes [1] information for identifying the chargeable condition used for a determination by the condition determining section 216, or [2] information for identifying the light emission condition used for a setting by the light emission setting section 218.

Operation of Touch Device 202

The input system 200 in the second embodiment is configured as described above. An automatic charging operation by the touch device 202 will next be described with reference to FIGS. 20 to 22.

Figure 20:
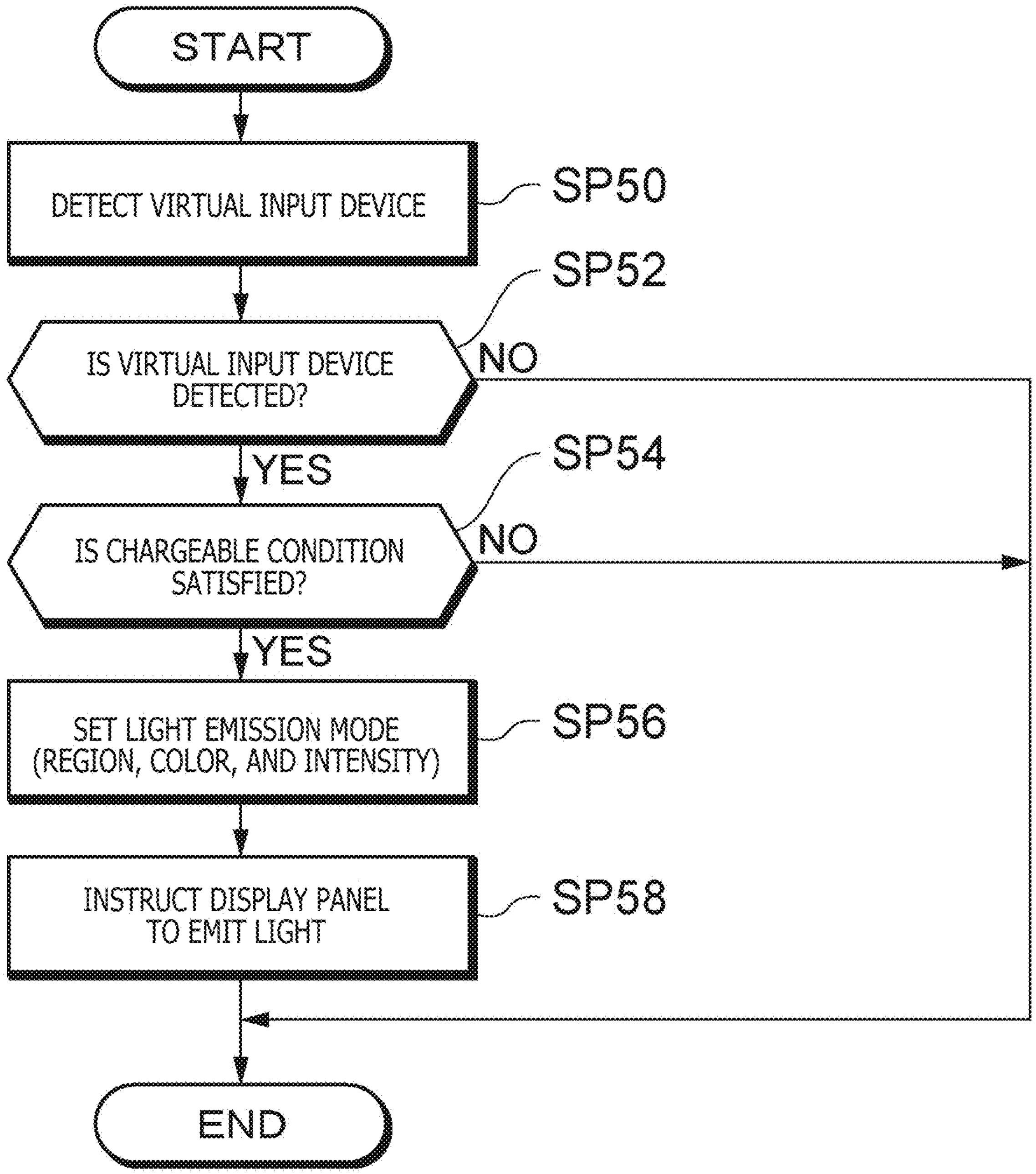
FIG. 20 is a flowchart related to a light emission operation of the touch device of FIG. 19.

FIG. 20 is a flowchart related to the automatic charging operation of the touch device 202. Each step of the flowchart is performed by the host processor 210 of the touch device 202.

In step SP50, the host processor 210 (more specifically, the light emission control section 214) detects the virtual input device 206 present on the touch surface 20 of the touch device 202.

In step SP52, the light emission control section 214 (more specifically, the condition determining section 216) checks whether or not the virtual input device 206 is detected in step SP50. When the virtual input device 206 is not detected (step SP52: NO), the light emission control section 214 ends the execution of the flowchart of FIG. 20. When the virtual input device 206 is detected (step SP52: YES), on the other hand, the light emission control section 214 proceeds to next step SP54.

In step SP54, the condition determining section 216 determines whether or not the chargeable condition is satisfied. When the chargeable condition is not satisfied (step SP54: NO), the light emission control section 214 ends the execution of the flowchart of FIG. 20. When the chargeable condition is satisfied (step SP52: YES), on the other hand, the light emission control section 214 proceeds to next step SP56.

In step SP56, the light emission control section 214 (more specifically, the light emission setting section 218) sets the light emission condition of the display panel 80.

Figure 21:
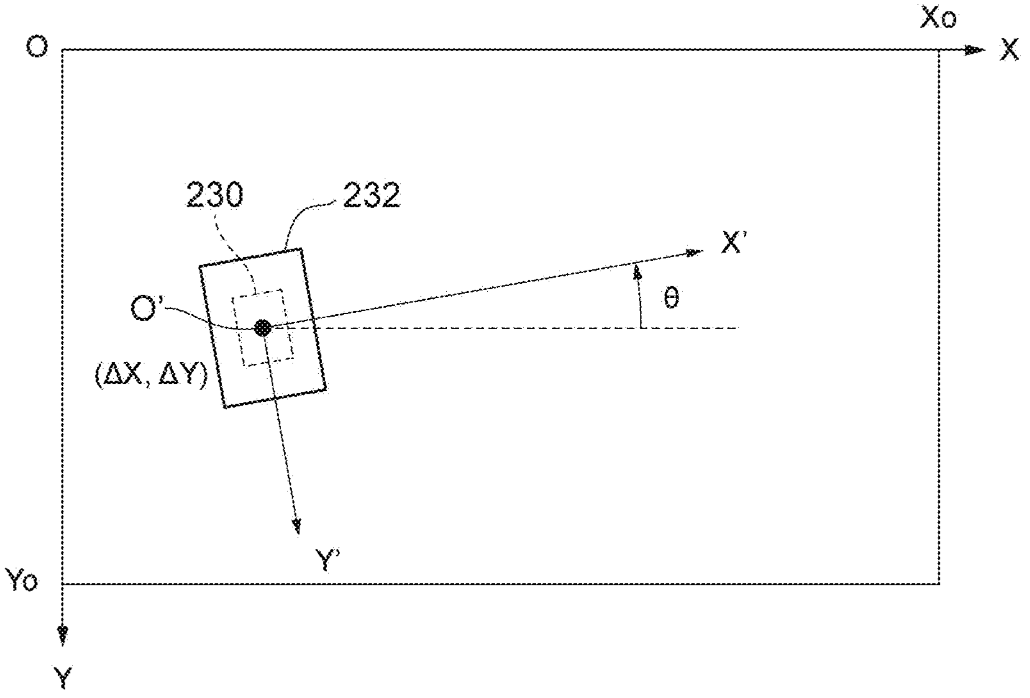
FIG. 21 is a diagram illustrating an example of a method of setting a light emitting region in a display panel.

FIG. 21 is a diagram illustrating an example of a method of setting a light emitting region 232 on the display panel 80. Specifically, FIG. 21 illustrates relative positional relation between a detected region 230 and the light emitting region 232. The detected region 230 represents the presence range of the pad attachment 24B. The light emitting region 232 represents a range of light emission for charging. Here, suppose that the origin O' is shifted in position by ($\Delta X$, $\Delta Y$) with respect to the origin O, and that the X' axis (Y' axis) is inclined by an angle $\theta$ with respect to the X-axis (Y-axis). Thus, the light emitting region 232 is set to include the presence range of the pad attachment 24B.

In step SP58 in FIG. 20, the light emission control section 214 controls the light emission of the display panel 80 according to the light emission condition set in step SP56.

Figure 22:
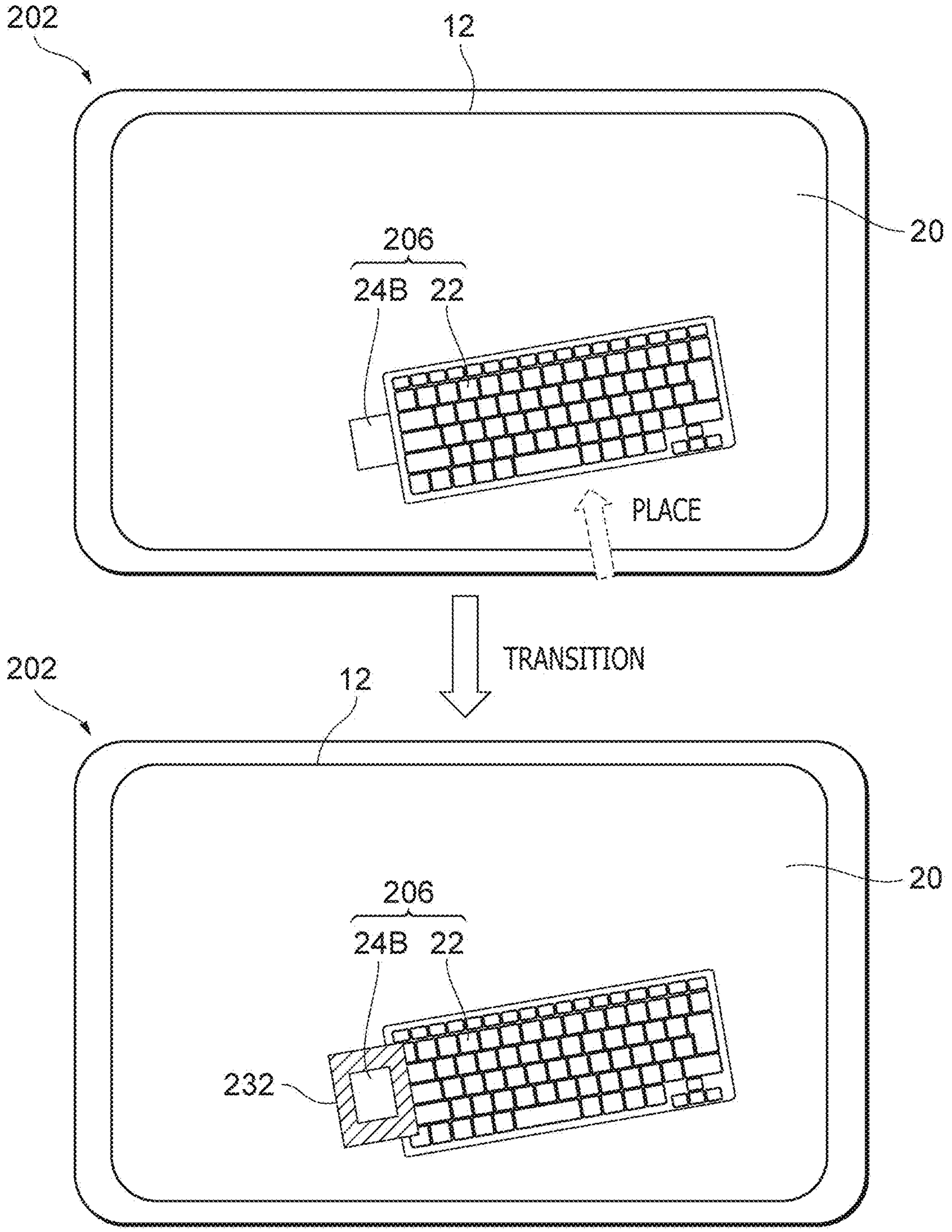
FIG. 22 is a diagram of a screen transition of a touch panel display in accordance with a change in the disposition of a virtual input device.

FIG. 22 is a diagram of a screen transition of the touch panel display 12 in accordance with a change in the disposition (placement) of the virtual input device 206. Suppose that, as illustrated in the upper side of FIG. 22, the user disposes, on the touch surface 20, the virtual input device 206 in a desired position and a desired orientation in order to charge the pad attachment 24B of the virtual input device 206. Then, triggered by a start of a communication, a transition is made from a display state illustrated in the upper side of FIG. 22 to a display state illustrated in the lower side of FIG. 22.

As illustrated in the lower side of FIG. 22, the touch panel display 12 emits light only in the part of the light emitting region 232 that contains the pad attachment 24B. The touch device 202 thereby performs [1] an "automatic charging function" of automatically charging the pad attachment 24B, or [2] a "communicating function" using visible light as a transmission medium.

Summary of Second Embodiment

As described above, the input system 200 according to the second embodiment includes the touch device 202, which includes the capacitive type touch sensor 82, and the virtual input device 206, which is used in conjunction with the touch device 202. The pad attachment 24B constituting a part of the virtual input device 206 includes the storage unit 46, which stores electric energy or discharges electric energy, and the photoelectric conversion unit 208, which converts external light into electric energy and supplies the electric energy to the storage unit 46.

The touch device 202 further includes the display panel 80, which displays an image or a video, and the host processor 210, which controls light emission of the display panel 80. Triggered by the pad attachment 24B being disposed on the display panel 80, the host processor 210 performs control such that the display panel 80 emits light in at least a part of the presence region of the pad attachment 24B. It is thereby possible to charge the pad attachment 24B automatically while utilizing the light emitting function of the display panel 80.

The host processor 210 may set a light emission condition, which is related to a light emission range, a light emission color, or a light emission intensity, and may control the light emission of the display panel 80 according to the light emission condition. It is thereby possible to enhance the charging efficiency of the pad attachment 24B, in terms of a light emission range, a light emission color, or a light emission intensity.

The host processor 210 may set the light emission range according to the detected position of the pad attachment 24B or the photoelectric conversion unit 208. It is thereby possible to perform light emission in reference to the position of the pad attachment 24B or the photoelectric conversion unit 208, so as to further enhance the charge efficiency of the pad attachment 24B.

The host processor 210 may set the light emission color according to the type of the pad attachment 24B or the photoelectric conversion unit 208. It is thereby possible to perform light emission in reference to the wavelength dependence of photoelectric conversion efficiency of the photoelectric conversion unit 208, so as to further enhance the charge efficiency of the pad attachment 24B.

The host processor 210 may set the light emission intensity according to the power supply remaining capacity of the storage unit 46 or the type of the set charging mode. It is thereby possible to perform light emission in reference to the power supply remaining capacity or the charging mode, so as to perform charging of the pad attachment 24B depending on electric power conditions.

The invention claimed is:

1. A pad attachment, which is attached to an operation pad that has at least one physical operation element and that is configured to be disposed on a touch device including a capacitive type touch sensor, the pad attachment comprising:

a memory configured to store device information related to the operation pad;

one or more communication elements configured to perform a wireless communication with the touch device via the touch sensor or via a planar sensor different from the touch sensor, wherein the one or more communication elements include a first electrode and a second electrode arranged at different positions of the pad attachment; and a transmitting circuit configured to transmit a transmission signal including the device information read from the memory, from at least one of the first electrode and the second electrode to the touch device, via the touch sensor or via the planar sensor.

2. The pad attachment according to claim 1, wherein the device information includes pad information related to a type of the operation pad, an arrangement of the at least one physical operation element, or setting contents related to an operation of the operation pad.

3. The pad attachment according to claim 1, wherein in a case where an operating function is assigned to an additional region that is part of a sensor region of the touch sensor and that is different from a region in which the operation pad is disposed, the device information includes additional region information related to a type of the operating function, a position, a size, or a shape of the additional region, or setting contents related to the operating function.

4. The pad attachment according to claim 1, wherein the device information includes identification information of a virtual input device including the operation pad, the operation pad, or the pad attachment.

5. A virtual input device comprising:

an operation pad that has at least one physical operation element and that is configured to be disposed on a touch device including a capacitive type touch sensor; and a pad attachment attached to the operation pad, the pad attachment including:

a memory configured to store device information related to the virtual input device, one or more communication elements configured to perform a wireless communication with the touch device via the touch sensor or via a planar sensor different from the touch sensor, wherein the one or more communication elements include a first electrode and a second electrode arranged at different positions of the pad attachment, and a transmitting circuit configured to transmit a transmission signal including the device information read from the memory, from at least one of the first electrode and the second electrode to the touch device, via the touch sensor or via the planar sensor.

6. An input system comprising:

a touch device including a touch sensor and a processor; and a virtual input device including:

an operation pad that has at least one physical operation element and that is configured to be disposed on the touch device; and a pad attachment attached to the operation pad, the pad attachment including:

a memory configured to store device information related to the virtual input device, one or more communication elements configured to perform a wireless communication with the touch device via the touch sensor or via a planar sensor different from the touch sensor, wherein the one or more communication elements include a first electrode and a second electrode arranged at different positions of the pad attachment, and a transmitting circuit configured to transmit a transmission signal including the device information read from the memory, from at least one of the first electrode and the second electrode to the touch device, via the touch sensor or via the planar sensor, wherein the processor of the touch device, while the wireless communication is performed between the processor and the pad attachment, generates or outputs data including operation information indicating an operation state of the operation pad in accordance with a capacitance change in an operation region defined based on detected positions of the first and second electrodes, wherein the operation information is different from position information indicating the detected positions of the first and second electrodes.

7. The input system according to claim 6, wherein the operation region is defined by setting a coordinate system based on the detected positions of the first and second electrodes.

8. The input system according to claim 6, wherein the processor of the touch device obtains identification information of the virtual input device by the wireless communication with the pad attachment, and the processor of the touch device acquires an arrangement of the at least one physical operation element or setting contents related to an operation of the operation pad corresponding to the identification information of the virtual input device, by a communication with an external device different from the pad attachment.

9. The input system according to claim 6, wherein the operation pad is configured to, when a user depresses the at least one physical operation element from a top surface side in a state in which the operation pad is disposed on the touch device, produce a capacitance change at a part of the touch sensor corresponding to a position of the at least one physical operation element when a user's finger or other conductor material approaches the part.

10. The input system according to claim 9, wherein the at least one physical operation element includes an operation member having conductivity and elasticity.

11. The input system according to claim 6, wherein the pad attachment includes:

a storage unit configured to store or discharge electric energy, and a photoelectric conversion unit configured to convert external light into electric energy and supply the electric energy to the storage unit.

12. The input system according to claim 11, wherein the touch device includes:

a display panel configured to display an image or a video, and the processor of the touch device controls light emission of the display panel, wherein the processor, in response to the pad attachment being disposed on the display panel, controls the display panel to emit light in at least a part of a presence region of the pad attachment.

13. The input system according to claim 12, wherein the processor sets a light emission condition related to a light emission range, a light emission color, or a light emission intensity, and controls the light emission of the display panel according to the light emission condition.

14. The input system according to claim 13, wherein the processor sets the light emission range according to a detected position of the pad attachment or the photoelectric conversion unit.

15. The input system according to claim 13, wherein the processor sets the light emission color according to a type of the pad attachment or the photoelectric conversion unit.

16. The input system according to claim 13, wherein the processor sets the light emission intensity according to a power supply remaining capacity of the storage unit or a type of a set charging mode.

* * * * *